(12) United States Patent
Carlson et al.

(10) Patent No.: US 7,133,907 B2
(45) Date of Patent: Nov. 7, 2006

(54) METHOD, SYSTEM, AND PROGRAM FOR CONFIGURING SYSTEM RESOURCES

(75) Inventors: Mark A. Carlson, Boulder, CO (US); Rowan E. da Silva, Nashua, NH (US)

(73) Assignee: Sun Microsystems, Inc., Palo Alto, CA (US)

(*) Notice: Subject to any disclaimer, the term of this patent is extended or adjusted under 35 U.S.C. 154(b) by 1020 days.

(21) Appl. No.: 10/041,883

(22) Filed: Oct. 18, 2001

(65) Prior Publication Data

US 2003/0093501 A1    May 15, 2003

(51) Int. Cl.
*G06F 15/177* (2006.01)

(52) U.S. Cl. ............... 709/220; 709/223; 709/226; 707/9; 707/10

(58) Field of Classification Search ............ 709/220, 709/223–226, 221–222, 229; 707/9, 10
See application file for complete search history.

(56) References Cited

U.S. PATENT DOCUMENTS

| | | | |
|---|---|---|---|
| 2,012,527 A | 8/1935 | Batchelder |
| 2,675,228 A | 4/1954 | Baird et al. |
| 3,571,677 A | 3/1971 | Oeschger |
| 4,138,692 A | 2/1979 | Meeker |
| 4,228,219 A | 10/1980 | De Jager |
| 4,558,395 A | 12/1985 | Yamada |
| 4,665,466 A | 5/1987 | Green |
| 4,721,996 A | 1/1988 | Tustaniwskyj |
| 4,729,424 A | 3/1988 | Mizuno |
| 4,733,331 A | 3/1988 | Chauvet |
| 4,791,983 A | 12/1988 | Nicol |
| 4,809,134 A | 2/1989 | Tustaniwskyj |
| 4,870,477 A | 9/1989 | Nakanishi |
| 4,882,654 A | 11/1989 | Nelson |
| 4,977,444 A | 12/1990 | Nakajima |
| 5,144,531 A | 9/1992 | Go |
| 5,166,863 A | 11/1992 | Shmunis |
| 5,177,667 A | 1/1993 | Graham |
| 5,183,104 A | 2/1993 | Novotny |
| 5,282,847 A | 2/1994 | Koizumi |
| 5,305,461 A | 4/1994 | Feinenbaum et al. |

(Continued)

FOREIGN PATENT DOCUMENTS

EP    0 623 876 A1    11/1994

(Continued)

OTHER PUBLICATIONS

Anonymous, "Jini: New Technology for a Networked World", URL:http://javaworld.com/javaworld/jw-06-1999/jw-06-jiniology_p.html, Jun. 30, 1999, p. 1-5.

(Continued)

*Primary Examiner*—Philip B. Tran

(57) ABSTRACT

Provided is a method, system, and program for configuring multiple resources in a system. A plurality of elements are provided that are capable of configuring resources in the system, wherein each element specifies configuration parameters to use to configure instances of the resource. Each resource is capable of being configured by multiple elements that provide a different configuration of the resource. Service information is maintained indicating at least one performance and availability attribute of the configuration of the resource by the element. At least one administrator specified performance and availability attribute for a configuration is received. A determination is made of at least one element for each resource having service information indicating at least one performance and availability attribute that satisfies the at least one administrator specified performance and availability attribute. A determination is further made of resource instances capable of being configured by the determined elements. The determined elements are then used to configure the selected resource instances.

48 Claims, 13 Drawing Sheets

U.S. PATENT DOCUMENTS

| | | | |
|---|---|---|---|
| 5,323,847 A | 6/1994 | Koizumi | |
| 5,406,807 A | 4/1995 | Ashiwake | |
| 5,465,192 A | 11/1995 | Yoshikawa | |
| 5,504,858 A | 4/1996 | Ellis et al. | |
| 5,535,094 A | 7/1996 | Nelson | |
| 5,588,119 A | 12/1996 | Vincent | |
| 5,675,473 A | 10/1997 | McDunn | |
| 5,701,045 A | 12/1997 | Yokozawa | |
| 5,706,668 A | 1/1998 | Hilpert | |
| 5,751,933 A | 5/1998 | Dev | |
| 5,771,388 A | 6/1998 | Mondrik et al. | |
| 5,912,802 A | 6/1999 | Nelson | |
| 5,940,269 A | 8/1999 | Ko | |
| 5,950,011 A | 9/1999 | Albrecht | |
| 5,956,750 A | 9/1999 | Yamamoto et al. | |
| 6,006,251 A | 12/1999 | Toyouchi et al. | |
| 6,029,742 A | 2/2000 | Burward-Hoy | |
| 6,031,528 A | 2/2000 | Langfahl | |
| 6,050,327 A | 4/2000 | Gates | |
| 6,058,426 A | 5/2000 | Godwin et al. | |
| 6,067,545 A * | 5/2000 | Wolff | 709/223 |
| 6,067,559 A | 5/2000 | Allard et al. | |
| 6,101,616 A | 8/2000 | Joubert | |
| 6,118,776 A | 9/2000 | Berman | |
| 6,119,118 A | 9/2000 | Kain et al. | |
| 6,125,924 A | 10/2000 | Lin | |
| 6,130,820 A | 10/2000 | Konstad | |
| 6,135,200 A | 10/2000 | Okochi | |
| 6,137,680 A | 10/2000 | Kodaira | |
| 6,144,379 A | 11/2000 | Bertram | |
| 6,151,031 A | 11/2000 | Atkins et al. | |
| 6,151,331 A | 11/2000 | Wilson | |
| 6,167,445 A | 12/2000 | Gai et al. | |
| 6,182,142 B1 * | 1/2001 | Win et al. | 709/229 |
| 6,205,796 B1 | 3/2001 | Chu | |
| 6,205,803 B1 | 3/2001 | Scaringe | |
| 6,213,194 B1 | 4/2001 | Chrysler | |
| 6,229,538 B1 | 5/2001 | McIntyre | |
| 6,243,747 B1 | 6/2001 | Lewis et al. | |
| 6,301,605 B1 | 10/2001 | Napolitano et al. | |
| 6,313,990 B1 | 11/2001 | Cheon | |
| 6,314,555 B1 | 11/2001 | Ndumu et al. | |
| 6,381,637 B1 | 4/2002 | Kamada | |
| 6,392,667 B1 | 5/2002 | McKinnon et al. | |
| 6,396,697 B1 | 5/2002 | Chen | |
| 6,408,336 B1 * | 6/2002 | Schneider et al. | 709/229 |
| 6,425,005 B1 | 7/2002 | Dugan et al. | |
| 6,425,007 B1 | 7/2002 | Messinger | |
| 6,438,984 B1 | 8/2002 | Novotny | |
| 6,463,454 B1 | 10/2002 | Lumelsky et al. | |
| 6,477,572 B1 | 11/2002 | Elderton | |
| 6,487,643 B1 | 11/2002 | Khare et al. | |
| 6,496,871 B1 | 12/2002 | Jagannathan et al. | |
| 6,505,244 B1 | 1/2003 | Natarajan et al. | |
| 6,526,768 B1 | 3/2003 | Wall | |
| 6,542,360 B1 | 4/2003 | Koizumi | |
| 6,574,708 B1 | 6/2003 | Hayter et al. | |
| 6,587,343 B1 | 7/2003 | Novotny | |
| 6,604,136 B1 | 8/2003 | Chang et al. | |
| 6,604,137 B1 | 8/2003 | Cowan | |
| 6,628,304 B1 | 9/2003 | Mitchell | |
| 6,636,239 B1 | 10/2003 | Arquie et al. | |
| 6,658,526 B1 | 12/2003 | Nguyen et al. | |
| 6,671,776 B1 | 12/2003 | DeKoning | |
| 6,704,778 B1 | 3/2004 | Horman | |
| 6,714,936 B1 | 3/2004 | Nevin | |
| 6,760,761 B1 | 7/2004 | Sciacca | |
| 6,772,204 B1 | 8/2004 | Hansen | |
| 6,775,700 B1 * | 8/2004 | Cheng et al. | 709/225 |
| 6,799,208 B1 | 9/2004 | Sankaranarayan et al. | |
| 6,823,382 B1 | 11/2004 | Stone | |
| 6,834,298 B1 | 12/2004 | Singer et al. | |
| 6,845,395 B1 * | 1/2005 | Blumenau et al. | 709/223 |
| 6,871,232 B1 | 3/2005 | Curie et al. | |
| 2001/0043617 A1 | 11/2001 | Mckinnon | |
| 2001/0044907 A1 | 11/2001 | Yoshimoto et al. | |
| 2002/0019864 A1 | 2/2002 | Mayer | |
| 2002/0069377 A1 | 6/2002 | Mabuchi et al. | |
| 2002/0083169 A1 | 6/2002 | Aki et al. | |
| 2002/0113816 A1 | 8/2002 | Mitchell et al. | |
| 2002/0133669 A1 | 9/2002 | Devireddy et al. | |
| 2002/0143905 A1 | 10/2002 | Govindarajan et al. | |
| 2002/0143920 A1 | 10/2002 | Dev et al. | |
| 2002/0147801 A1 * | 10/2002 | Gullotta et al. | 709/223 |
| 2002/0152305 A1 | 10/2002 | Jackson et al. | |
| 2002/0162010 A1 | 10/2002 | Allen et al. | |
| 2002/0169858 A1 | 11/2002 | Bellinger et al. | |
| 2002/0178380 A1 | 11/2002 | Wolf et al. | |
| 2002/0184300 A1 | 12/2002 | Schmelling et al. | |
| 2002/0188584 A1 | 12/2002 | Ghannam | |
| 2002/0194407 A1 | 12/2002 | Kim | |
| 2003/0028624 A1 | 2/2003 | Hasan et al. | |
| 2003/0055972 A1 | 3/2003 | Fuller et al. | |
| 2003/0074599 A1 | 4/2003 | Golasky et al. | |
| 2003/0091037 A1 | 5/2003 | Latif et al. | |
| 2003/0093501 A1 | 5/2003 | Carlson et al. | |
| 2003/0169289 A1 | 9/2003 | Holt | |
| 2003/0184580 A1 | 10/2003 | Kodosky et al. | |

FOREIGN PATENT DOCUMENTS

| | | |
|---|---|---|
| EP | 0 773 649 A2 | 5/1997 |
| EP | 1 111 840 A2 | 6/2001 |
| GB | 2 278 468 A | 11/1994 |
| GB | 2 344 963 A1 | 6/2000 |
| GB | 2 354 611 A1 | 3/2001 |
| WO | WO9842102 A1 | 9/1998 |
| WO | WO0029954 A1 | 5/2000 |
| WO | WO0072183 A2 | 11/2000 |
| WO | WO0130007 A2 | 4/2001 |
| WO | WO0225870 A1 | 3/2002 |
| WO | WO02089418 A1 | 11/2002 |
| WO | WO 03/014911 A2 | 2/2003 |

OTHER PUBLICATIONS

Anonymous, "Pattern: Blackboard", http://www.vico.org/pages/Patrons%20Blackboard, Jul. 12, 2002, p. 1-2.

Anonymous, "Javaone—Sun's 2000 Worldwide Java Developer Conference", http://servlet.java.sun.com/javaone/javaone2000/pdfs/TS-1156.pdf, Nov. 24, 2003.

Brent Knight, "Reducing the Complexity of Managing Private Loops", / /, p. 1-11.

Bushman, "Pattern Oriented Software Architecture, A System of Patterns", / /, p. 71-95, John Wiley & Sons, New York.

Dupuy, et al., "Netmate: A Network Management Environment", IEEE Network, Mar. 5, 1991, p. 35-40, New York.

Finke, et al., "Distribution and Inheritance in the HERON Approach to Heterogeneous Computing", Proceedings of the Int'l Conf on Distributed Computing Systems, May 25, 1993, p. 399-408, IEEE Comp Soc Press, Los Alamitos.

Richard, "Fibre Channel as a Network Backbone", WESCON/94, Idea/Microelectronics, Conference record Anaheim, p. 653-659, New York.

Business Editors & High-Tech Writers, "Tivoli Simplifies SAN Management", Business Wire, Oct. 9, 2000, New York.

Anonymous, "Jiro Technology Technical Overview", URL:http://sunsolve.sun.com/kmsattachments/22961.

Martin Jean-Christophe, "Policy-Based Networks", URL:http://www.sun.com/solutions/blueprints/1099/policy.pdf.

Anonymous, "Sun's Managed Storage Networks", URL:http://sunsolve.sun.com/kmsattachments/22955.

Anonymous, "Jiro Technical Overview White Paper", Free White Papers/Tech Bulletins, Sun-Solve Search Result, URL:http://sunsolve.sun.com/pub-cgi/retrieve.pl?doc=fwpaper/22961@zone_32=jiro.

Anonymous, "Managed Storage Networks White Paper", Free White Papers/Tech Bulletins, Sun-Solve Search Result, URL:http://sunsolve.sun.com/pub-cgi/retrieve.pl?doc=fwpaper/22955@zone_32 =managed.

Preliminary Amendment submitted in U.S. Appl. No. 09/928,128, filed on Aug. 10, 2001.

U.S. Appl. No. 09/928,128, filed on Aug. 10, 2001, entitled, "Method, System, and Program for Generating and Using Configuration Policies", invented by M.A. Carlson and R.E. de Silva.

U.S. Appl. No. 09/927,985, filed on Aug. 10, 2001, entitled, "Method, System, and Program for Managing Multiple Resources in a System", invented by M.A. Carlson and R.E. de Silva.

Sun Microsystems, Inc., "Federated Management Architecture (FMA) Specification", Version 1.0, Rev. 0.4, Jan. 21, 2000, pp. 1-184.

Wilson, S., for Brocade Communications Systems, Inc., "Fibre Channel Storage Area Network Discovery", Rev. 3.5, Sep. 10, 1999, pp. 1-20.

Veritas Software Corporation, "Storage Virtualization", Apr. 2001, pp. 1-19.

Sun Microsystems, Inc., "Sun StorEdge Component Manager 2.1 User's Guide", Rev. A, Jul. 2000, pp. 1-148.

Blake, "An Agent-Based Cross-Organizational Workflow Architecture in Support of Web Services", Proceedings of 11th IEEE Int'l Workshops on Enabling Tech., 2002 IEEE, Computer Science.

Cazalens, et al., "A Web Site Indexing Process for an Internet Information Retrieval Agent System", Unknown, 2000 IEEE, 254-258, Unknown, Nantes Cedex.

Mukhopadha, et al., "Multi-Agent Marko v Decision Processes With Limited Agent Communication", Proceedings of the 2001 IEEE, Sep. 5-7, 2001, pp. 7-12, Mexico City.

* cited by examiner

128a...n

| Service Attributes | | | | |
|---|---|---|---|---|
| Availability/ Redundancy | Performance | Configurable Resources | Other | Element Configuration Policy ID |

Configuration Policy Tool 270                                            770

| Element Configuration Policy | Throughput | Availability | Latency |
|---|---|---|---|
| Switch Element 132 | 10-100 MB/sec | Standard | High |
| Switch Element 133 | 100-200 MB/sec | High | Standard |
| . . . . | . . . . | . . . . | . . . . |
| HBA Element 320 | 10-100 MB/sec | High | Standard |
| HBA Element 133 | 100-200 MB/sec | Continuous | Low |

772  774  776  778

Element Configuration Attribute Table

FIG. 12

METHOD, SYSTEM, AND PROGRAM FOR CONFIGURING SYSTEM RESOURCES

RELATED APPLICATIONS

This application is related to the following co-pending and commonly assigned patent applications filed on the same date herewith and which are incorporated herein by reference in their entirety:

"Method, System, And Program For Managing Multiple Resources in a System", by Mark A. Carlson and Rowan E. da Silva, having U.S. application Ser. No. 09/927,985 and filed on Aug. 10, 2001; and "Method, System, and Program for Generating and Using Configuration Policies", by Mark A. Carlson and Rowan E. da Silva, having U.S. application Ser. No. 09/928,128 and filed on Aug. 10, 2001.

BACKGROUND OF THE INVENTION

1. Field of the Invention

The present invention relates to a method, system, and program for configuring system resources.

2. Description of the Related Art

A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. Storage area networks (SAN) typically use the Fibre Channel protocol, which uses optical fibers to connect devices and provide high bandwidth communication between the devices. In Fibre Channel terms the one or more switches interconnecting the devices is called a "fabric". However, SANs may also be implemented in alternative protocols, such as InfiniBand**, IPStorage over Gigabit Ethernet, etc.

**JIRO, JAVA, SUN, and SUN MICROSYSTEMS are trademarks of Sun Microsystems, Inc. InfiniBand is a service mark of the InfiniBand Trade Association; MICROSOFT and .NET are trademarks of Microsoft Corporation.

In the current art, to add or modify the allocation of storage or other resources in a SAN, an administrator must separately utilize different software programs to configure the SAN resources to reflect the modification to the storage allocation. For instance to allow a host to alter the allocation of storage space in the SAN, the administrator would have to perform one or more of the following:

use a storage device configuration tool to resize a logical volume, such as a logical unit number (LUN), or change the logical volume configuration at the storage device, e.g., the RAID or JBOD, to provide more or less storage space to the host.

a switch configuration tool to alter the assignment of paths in the switch to the host, i.e., rezoning, to provide access to the newly reconfigured logical volume (LUN).

perform LUN masking, which involves altering the assignment of HBA interface ports to the reconfigured LUNs.

use a host volume manager configuration tool to alter the allocation of physical storage to logical volumes used by the host. For instance if the administrator adds storage, then the logical volume must be updated to reflect the added storage.

use a backup program manager to reflect the change in storage allocation so that the backup program will backup more or less data for the host.

use a snapshot copy configuration manager to update the host logical volumes that are subject to a snapshot copy, where a backup copy is made by copying the pointers in the logical volume.

Not only does the administrator have to invoke one or more of the above tools to implement the requested storage allocation change throughout the SAN, but the administrator may also have to perform these configuration operations repeatedly if the configuration of multiple distributed devices is involved. For instance, to add several gigabytes of storage to a host logical volume, the administrator may allocate storage space on different storage subsystems in the SAN, such as different RAID boxes. In such case, the administrator would have to separately invoke the configuration tool for each separate device involved in the new allocation. Further, when allocating more storage space to a host logical volume, the administrator may have to allocate additional storage paths through separate switches that lead to the one or more storage subsystems including the new allocated space. The complexity of the configuration operations the administrator must perform further increases as the number of managed components in a SAN increase. Moreover, the larger the SAN, the increased likelihood of hosts requesting storage space reallocations to reflect new storage allocation needs.

Additionally, many systems administrators are generalists and may not have the level of expertise to use a myriad of configuration tools to appropriately configure numerous different vendor resources. Still further, even if an administrator develops the skill and knowledge to optimally configure networks of components from different vendors, there is a concern for knowledge retention in the event the skilled administrator separates from the organization. Yet further, if administrators are not utilizing their configuration knowledge and skills, then their skill level at performing the configurations may decline.

All these factors, including the increasing complexity of storage networks, decreases the likelihood that the administrator may provide an optimal configuration.

The above described difficulties in configuring resources in a Fibre Channel SAN environment are also experienced in other storage environments including multiple storage devices, hosts, and switches, such as InfiniBand**, IPStorage over Gigabit Ethernet, etc.

**JIRO, JAVA, SUN, and SUN MICROSYSTEMS are trademarks of Sun Microsystems, Inc. InfiniBand is a service mark of the InfiniBand Trade Association; MICROSOFT and .NET are trademarks of Microsoft Corporation.

For all the above reasons, there is a need in the art for an improved technique for managing and configuring the allocation of resources in a large network, such as a SAN.

SUMMARY OF THE PREFERRED EMBODIMENTS

Provided is a method, system, and program for configuring multiple resources in a system. A plurality of elements are provided that are capable of configuring resources in the system, wherein each element specifies configuration parameters to use to configure instances of the resource. Each resource is capable of being configured by multiple elements that provide a different configuration of the resource. Service information is maintained indicating at least one service attribute that results from the configuration of the resource by the element. At least one specified service attribute is received for a configuration. A determination is made of at least one element for each resource having service information indicating at least one service that satisfies the at least one administrator specified service attribute. A determination is further made of resource instances capable of being configured by the determined elements. The determined elements are then used to configure the selected resource instances implement the specified service attributes.

In implementations where at least one resource comprises a switch, the service information for switch elements that configure the switch resource indicates a data throughput of the switch. Further, the administrator specified service attributes indicates a specified data throughput, wherein the determined switch element has service information that satisfies the specified data throughput, and wherein the determined switch element configures at least one switch instance to provide the specified data throughput.

In implementations where at least one of the determined resources comprises a storage resource, the service information associated with storage elements that configure the storage resource indicates an availability attribute, wherein the administrator specified service attribute for the storage resource indicates an availability level, and wherein the selected storage element that configures the storage resource has service information that satisfies the administrator specified availability In further implementations, the resources to configure are members of the set of configurable resources comprising a host adaptor, switch, storage resource, virtualization appliance, volume manager, and snapshot program.

Further provided is a method, system, and program for configuring storage resources in a system. A plurality of storage elements are provided that are capable of configuring the storage resources in the system, wherein each storage element specifies configuration parameters to use to configure the storage resource. Service information is maintained indicating at least one storage attribute resulting from the configuration by the element. At least one administrator specified attribute is received for the configuration of the storage resource. A determination is made of one storage element having service information indicating at least one attribute that satisfies the administrator specified attribute and a determination is made of storage resource instances capable of being configured by the determined element. The determined storage element is then used to configure the determined storage resources.

BRIEF DESCRIPTION OF THE DRAWINGS

Referring now to the drawings in which like reference numbers represent corresponding parts throughout:

FIG. 11 illustrates the format of service attributes in accordance with implementations of the invention;

FIG. 12 illustrates an element configuration attribute table in accordance with implementations of the invention;

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
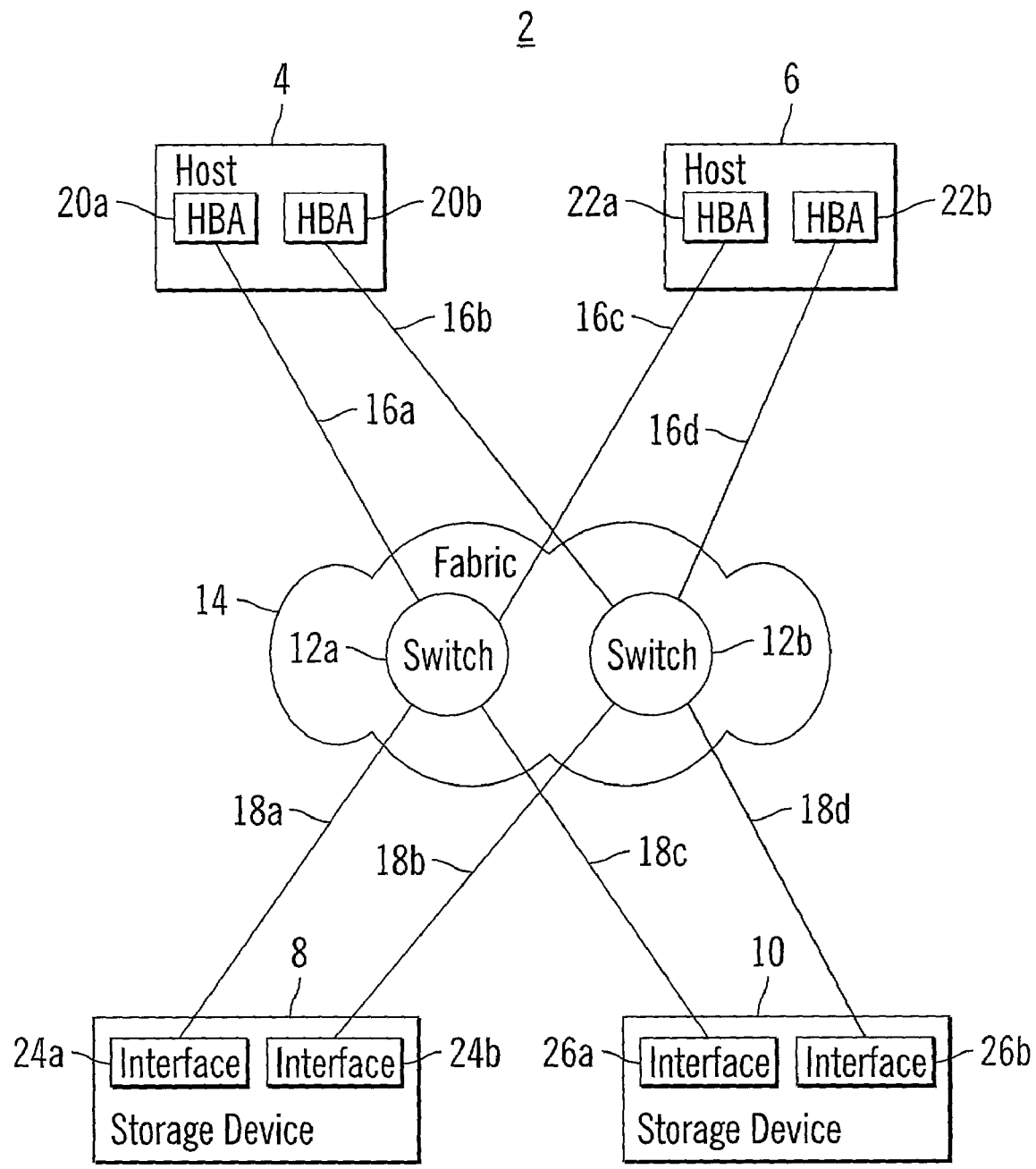
FIG. 1 illustrates a network computing environment for one implementation of the invention.

FIG. 1 illustrates an implementation of a Fibre Channel based storage area network (SAN) which may be configured using the implementations described herein. Host computers 4 and 6 may comprise any computer system that is capable of submitting an Input/Output (I/O) request, such as a workstation, desktop computer, server, mainframe, laptop computer, handheld computer, telephony device, etc. The host computers 4 and 6 would submit I/O requests to storage devices 8 and 10. The storage devices 8 and 10 may comprise any storage device known in the art, such as a JBOD (just a bunch of disks), a RAID array, tape library, storage subsystem, etc. Switches 12a, b interconnect the attached devices 4, 6, 8, and 10. The fabric 14 comprises the switches 12a, b that enable the interconnection of the devices. In the described implementations, the links 16a, b, c, d and 18a, b, c, d connecting the devices comprise Fibre Channel fabrics, Internet Protocol (IP) switches, Infiniband fabrics, or other hardware that implements protocols such as Fibre Channel Arbitrated Loop (FCAL), IP, Infiniband, etc. In alternative implementations, the different components of the system may comprise any network communication technology known in the art. Each device 4, 6, 8, and 10 includes multiple Fibre Channel interfaces 20a, 20b, 22a, 22b, 24a, 24b, 26a, and 26b, where each interface, also referred to as a device or host bus adaptor (HBA), can have one or more ports. Moreover, actual SAN implementation may include additional storage devices, hosts, host bus adaptors, switches, etc., than those illustrated in FIG. 1.

A path, as that term is used herein, refers to all the components providing a connection from a host to a storage device. For instance, a path may comprise host adaptor 20a, fiber 16a, switch 12a, fiber 18a, and device interface 24a, and the storage devices or disks being accessed.

Certain described implementations provide a configuration technique that allows administrators to select a specific service configuration policy providing the path availability, RAID level, etc., to use to allocate, e.g., modify, remove or add, storage resources used by a host 4, 6 in the SAN 2. After the service configuration policy is specified, the component architecture implementation described herein automatically configures all the SAN components to implement the requested allocation at the specified configuration quality without any further administrator involvement, thereby streamlining the SAN storage resource configuration and allocation process. The requested allocation of the configuration is referred to as a service configuration policy that implements a particular configuration requested by a by calling the elements to handle the resource configuration. The policy provides a definition of configurations and how these elements in SAN are to be configured. In certain described implementations, the configuration architecture utilizes the Sun Microsystems, Inc. ("SUN") Jiro distributed computing architecture.**

**JIRO, JAVA, SUN, and SUN MICROSYSTEMS are trademarks of Sun Microsystems, Inc. InfiniBand is a service mark of the InfiniBand Trade Association; MICROSOFT and .NET are trademarks of Microsoft Corporation.

Jiro provides a set of program methods and interfaces to allow network users to locate, access, and share network resources, referred to as services. The services may include hardware devices, software devices, application programs, storage resources, communication channels, etc. Services are registered with a central lookup service server, which provides a repository of service proxies. A network participant may review the available services at the lookup service and access service proxy objects that enable the user to access the service through the service provider. A "proxy object" is an object that represents another object in another memory or program memory address space, such as a resource at a remote server, to enable access to that resource or object at the remote location. Network users may "lease" a service, and access the proxy object implementing the service for a period of time.

A service provider discovers lookup services and then registers service proxy objects and service attributes with the discovered lookup service. In Jiro, the service proxy object is written in the Java** programming language, and includes methods and interfaces to allow users to invoke and execute the service object located through the lookup service. A client accesses a service proxy object by querying the lookup service. The service proxy object provides Java interfaces to enable the client to communicate with the service provider and access the service available through the network. In this way, the client uses the proxy object to communicate with the service provider to access the service.

**JIRO, JAVA, SUN, and SUN MICROSYSTEMS are trademarks of Sun Microsystems, Inc. InfiniBand is a service mark of the InfiniBand Trade Association; MICROSOFT and .NET are trademarks of Microsoft Corporation.

Figure 2:
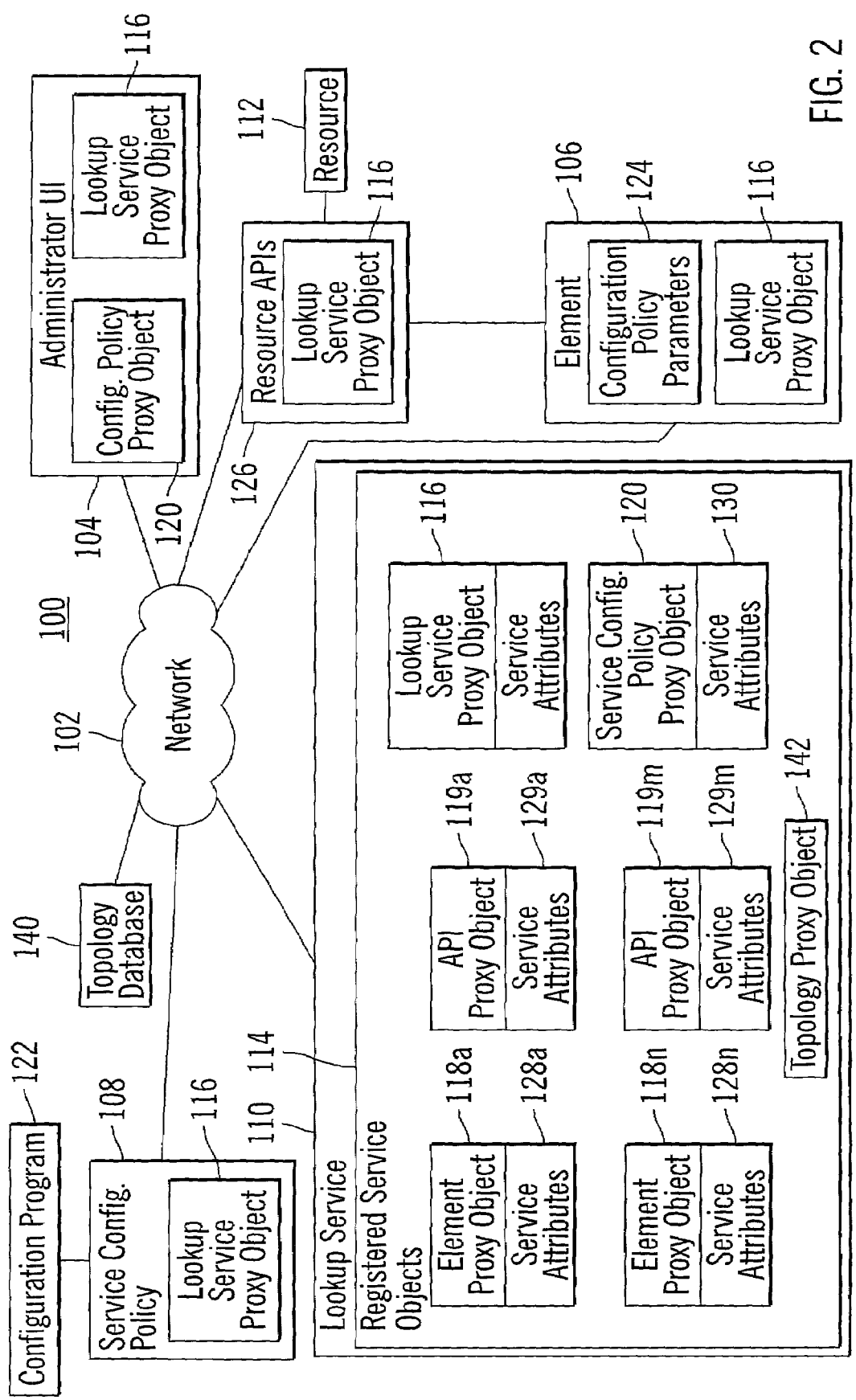
FIG. 2 illustrates a component architecture in accordance with certain implementations of the invention.

FIG. 2 illustrates a configuration architecture 100 using Jiro components to configure resources available over a network 102, such as hosts, switches, storage devices, etc. The network 102 may comprise the fiber links provided through the fabric 14. The network 102 allows for communication among an administrator user interface (UI) 104, one or more elements 106 (only one is shown, although multiple elements 106 may be present), one or more configuration policy services (only one is shown) 108, and a lookup service 110.

The network 102 may comprise the Internet, an Intranet, a LAN, etc., or any other network system known in the art, including wireless and non-wireless networks. The administrator UI 104 comprises a system that submits requests for access to network resources. For instance, the administrator UI 104 may request a new allocation of storage resources to hosts 4, 6 (FIG. 1) in the SAN 2. The administrator UI 104 may be implemented as a program within the host 4, 6 involved in the new storage allocation or a within system remote to the host. The administrator UI 104 provides access to the configuration resources described herein to alter the configuration of storage resources to hosts. The elements 106 provide a management interface to provide configuration and control over a resource 112. In SAN implementations, the resource 112 may comprise any resource in the system that is configured during the process of allocating resources to a host. For instance, the configurable resources 112 may include host bus adaptors 20a,b, 22a,b, a host volume manager which provides an assignment of logical volumes in the host 4, 6 to physical storage space in storage devices 8, 10, a backup program in the host 4, 6, a snapshot program in the host 4, 6 providing snapshot services (i.e., copying of pointers to logical volumes), switches 12a,b, storage devices 8, 10, etc. Multiple elements may be defined to provide different configuration qualities for a single resource. Each of the above components in the SAN would comprise a separate resource 112 in the system, where one or more elements 106 are provided for management and configuration of the resource. The service configuration policy 108 implements a particular configuration requested by the host 104 by calling the elements 106 to configure the resources 112.

In the architecture 100, the element 106, service configuration policy 108, and resource APIs 126 function as Jiro service providers that make services available to any network participant, including to each other and to the administrator UI 104. The lookup service 110 provides a Jiro lookup service in a manner known in the art. The lookup service 110 maintains registered service objects 114, including a lookup service proxy object 116, that enables network users, such as the administrator UI 104, elements 106, service configuration policies 108, and resource APIs 126 to access the lookup service 110 and the proxy objects 116, 118a . . . n, 119a . . . m, and 120 therein. For instance, each element 106 registers an element proxy object 118a . . . n, each resource API 126 registers an API proxy object 119a . . . m, and each service configuration policy 108 registers a service configuration policy proxy object 120 to provide access to the underlying resources. The service configuration policy 108 includes code to call elements 106 to perform the user requested configuration operations to reallocate storage resources to a specified host and logical volume.

With respect to the elements 106, the resources 112 comprise the underlying service resource being managed by the element 106, e.g., the storage devices 8, 10, host bus adaptors 16a,b,c,d, switches 12a,b, host volume manager, backup program, snapshot program, etc. The resource application program interfaces (APIs) 126 provide access to the configuration functions of the resource to perform the resource specific configuration operations. Thus, there is one resource API set 126 for each managed resource 112. The APIs 126 are accessible through the API proxy objects 119a . . . m. Because there may be multiple elements to provide different configurations of a resource 112, the number of registered element proxy objects n may exceed the number of registered API proxy objects m, because the multiple elements 106 that provide different configurations of the same resource 112 would use the same set of APIs 126.

The element 106 includes configuration policy parameters 124 that provide the settings and parameters to use when calling the APIs 126 to control the configuration of the resource 112. If there are multiple elements 106 for a single resource 112, then each of those elements 106 may provide a different set of configuration policy parameters 124 to configure the resource 112. For instance, if the resource 112 is a RAID storage device, then the configuration policy parameters 124 for one element may provide a RAID level abstract configuration, or some other defined RAID configuration, such as Online Analytical Processing (OLAP) RAID definitions and configurations which may define a RAID level, number of disks, etc. Another element may provide a different RAID level. Additionally, if the resource 112 is a switch, then the configuration policy parameters 124 for one element 106 may configure redundant paths through the switch to the storage space to avoid a single point of failure, whereas another element for the switch may configure only a single path. Thus, the elements 106 utilize the configuration policy parameters 124 and the resource API 126 to control the configuration of the resource 112, e.g., storage device 8, 10, switches 12a,b, volume manager, backup program, host bus adaptors (HBAs) 20a,b, 22a,b, etc.

Each service configuration policy 108 would call one of the elements 106 for each resource 112 to perform the administrator/user requested reconfiguration. There may be multiple service configuration policies for different predefined configuration qualities. For instance, there may be a higher quality service configuration policy, such as "gold", for critical data that would call one element 106 for each resource 112 to reconfigure, where the called element 106 configures the resource 112 to provide for extra protection, such as a high RAID level, redundant paths through the switch to the storage space to avoid a single point of failure, redundant use of host bus adaptors to further reduce a single point of failure at the host, etc. A "bronze" or lower quality service configuration policy may not require such redundancy and protection to provide storage space for less critical data. The "bronze" quality service configuration policy 108 would call the elements 106 that implement such a lower quality configuration policy with respect to the resources 112. Each called element 106 in turn calls the APIs 126 for the resource to reconfigure. Note that different service configuration policies 108 may call the same or different elements 106 to configure a particular resource.

Associated with each proxy object 118a . . . n, 119a . . . m, and 120 are service attributes 128a . . . n, 129a . . . n, and 130 that provide descriptive attributes of the proxy objects 118a . . . n, 119a . . . n, and 120. For instance, the administrator UI 104 may use the lookup service proxy object 116 to query the service attributes 130 of the service configuration policy 108 to determine the quality of service provided by the configuration policy, e.g., the RAID level, number of redundant paths, etc. The service attributes 128a . . . n for the elements 106 may describe the type of configuration performed by the specific element.

FIG. 2 further illustrates a topology database 140 which provides information on the topology of all the resources in the system, i.e., the connections between the host bus adaptors, switches and storage devices. The topology database 140 may be created during system initialization and updated whenever changes are made to the system configuration in a manner known in the art. For instance, the Fibre Channel and SCSI protocols provide protocols for discovering all of the components or nodes in the system and their connections to other components. Alternatively, out-of-band discovery techniques could utilize Simple Network Management Protocol (SNMP) commands to discover all the devices and their topology. The result of the discovery process is the topology database 140 that includes entries identifying the resources in each path in the system. Any particular resource may be available in multiple paths. For instance, a switch may be in multiple entries as the switch may provide multiple paths between different host bus adaptors and storage devices. The topology database 140 can be used to determine whether particular devices, e.g., host bus adaptors, switches and storage devices, can be used, i.e., are actually interconnected. The lookup service 114 maintains a topology proxy object 142 that provides methods for accessing the topology database 140 to determine how components in the system are connected.

When the service configuration policy proxy object 120 is created, the topology database 140 may be queried to determine those resources that can be used by the service configuration policy 108, i.e., those resources that when combined can satisfy the configuration policy parameters 124 of the elements 106 defined for the service configuration policy 108. The service configuration policy proxy object service attributes 130 may be updated to indicate the query results of those resources in the system that can be used with the configuration. The service attributes 130 may further provide topology information indicating how the resources, e.g., host bus adaptors, switches, and storage devices, are connected or form paths. In this way, the configuration policy proxy object service attributes 130 defines all paths of resources that satisfy the configuration policy parameters 124 of the elements 106 included in the service configuration policy.

In the architecture of FIG. 2, the service providers 108 (configuration policy service), 106 (element), and resource APIs 126 function as clients when downloading the lookup service proxy object 116 from the lookup service 110 and when invoking lookup service proxy object 116 methods and interfaces to register their respective service proxy objects 118a . . . n, 119a . . . m, and 120 with the lookup service 110. The client 104 and service providers 106 and 108 would execute methods and interfaces in the service proxy objects 118a . . . n, 119a . . . m, and 120 to communicate with the service provider 106, 108, and 126 to access the associated service. The registered service objects 118a . . . n, 119a . . . m, and 120 comprise the services available through the lookup service 110. The administrator UI 104 uses the lookup service proxy object 116 to access the proxy objects from the lookup service 110. Further details on how clients may discover and download the lookup service and service objects and register service objects are described in the Sun Microsystem, Inc. publications: "Jini Architecture Specification" (Copyright 2000, Sun Microsystems, Inc.) and "Jini Technology Core Platform Specification" (Copyright 2000, Sun Microsystems, Inc.), both of which publications are incorporated herein by reference in their entirety.

The resources 112, elements 106, service configuration policy 108, and resource APIs 126 may be implemented in any computational device known in the art and each include a Java Virtual Machine (JVM) and a Jiro package (not shown). The Jiro package includes all the Java methods and interfaces needed to implement the Jiro network environment in a manner known in the art. The JVM translates methods and interfaces of the Jiro package as well as the methods and interfaces of downloaded service objects, into bytecodes capable of executing on the configuration policy service 108, administrator UI 104 element 106, and resource APIs 126. Each component 104, 106, 108, and 110 further includes a network protocol stack (not shown) to enable communication over the network. The network protocol stack provides a network address for the components 104, 106, 108, 110, and 126, such as a Transmission Control Protocol/Internet Protocol (TCP/IP) address, support for unicast and multicast broadcasting, and a mechanism to facilitate the downloading of Java files. The network protocol stack may also include the communication infrastructure to allow objects, including proxy objects, on the systems to communicate, such as the Common Object Request Broker Architecture (CORBA), Remote Method Invocation (RMI), TCP/IP, etc.

As discussed, the configuration architecture may include multiple elements for the different configurable resources in the storage system. Following are the resources that may be configured through the proxy objects in the SAN:

Storage Devices: There may be a separate element service for each configurable storage device 8, 10. In such case, the resource 112 would comprise the configurable storage space of the storage devices 8, 10 and the element 106 would comprise the configuration software for managing and configuring the storage devices 8, 10 according to the configuration policy parameters 124. The element 106 would call the resource APIs 126 to access the functions of the storage configuration software.

Switch: There may be a separate element service for each configurable switch 12a,b. In such case, the resource 112 would comprise the paths in the switch and the element 106 would comprise the switch software for managing and configuring paths within the switch 12a,b according to the configuration policy parameters 124. The element 106 would call the resource APIs 126 to access the functions of the switch configuration software.

Host Bus Adaptors: There may be a separate element service to manage the allocation of the host bus adaptors 20a,b, 22a,b on each host 4, 6. In such case, the resource 112 would comprise all the host bus adaptors (HBAs) on a given host and the elements would comprise the configuration software for assigning the host bus adaptors (HBAs) to a path according to the configuration policy parameters 124. The element 106 would call the resource APIs 126 to access the functions of the host adaptor configuration software on each host 4, 6.

Volume Manager on the Host: There may be a separate element service for the volume manager on each host 4, 6. In such case, the resource 112 would comprise the mapping of logical to physical storage and the element 106 would comprise the software for configuring the mapping of the logical volumes viewed by the host 4, 6 to physical storage space in the storage devices 8, 10 according to the configuration policy parameters 124. The element 106 would call the resource APIs 126 to access the functions of the volume manager configuration software.

Backup Program on the Host: There may be a separate element service 106 for the backup program configuration at each host 4, 6. In such case, the resource 112 would comprise the configurable backup program for the host 4, 6 and the element 106 would comprise software for managing and configuring backup operations for the host 4, 6 according to the configuration policy parameters 124. The element 106 would call the resource APIs 126 to access the functions of the backup management software.

Snapshot on the Host: There may be a separate element service 106 for the snapshot configuration for each host 4, 6. In such case, the resource 112 would comprise the snapshot operation on the host and the element 106 would comprise the software to select logical volumes to copy as part of a snapshot operation according to the configuration policy parameters 124. The element 106 would call the resource APIs 126 to access the functions of the snapshot configuration software.

Element services may also be provided for other network based storage devices and host based storage software other than those described herein.

Figure 3:
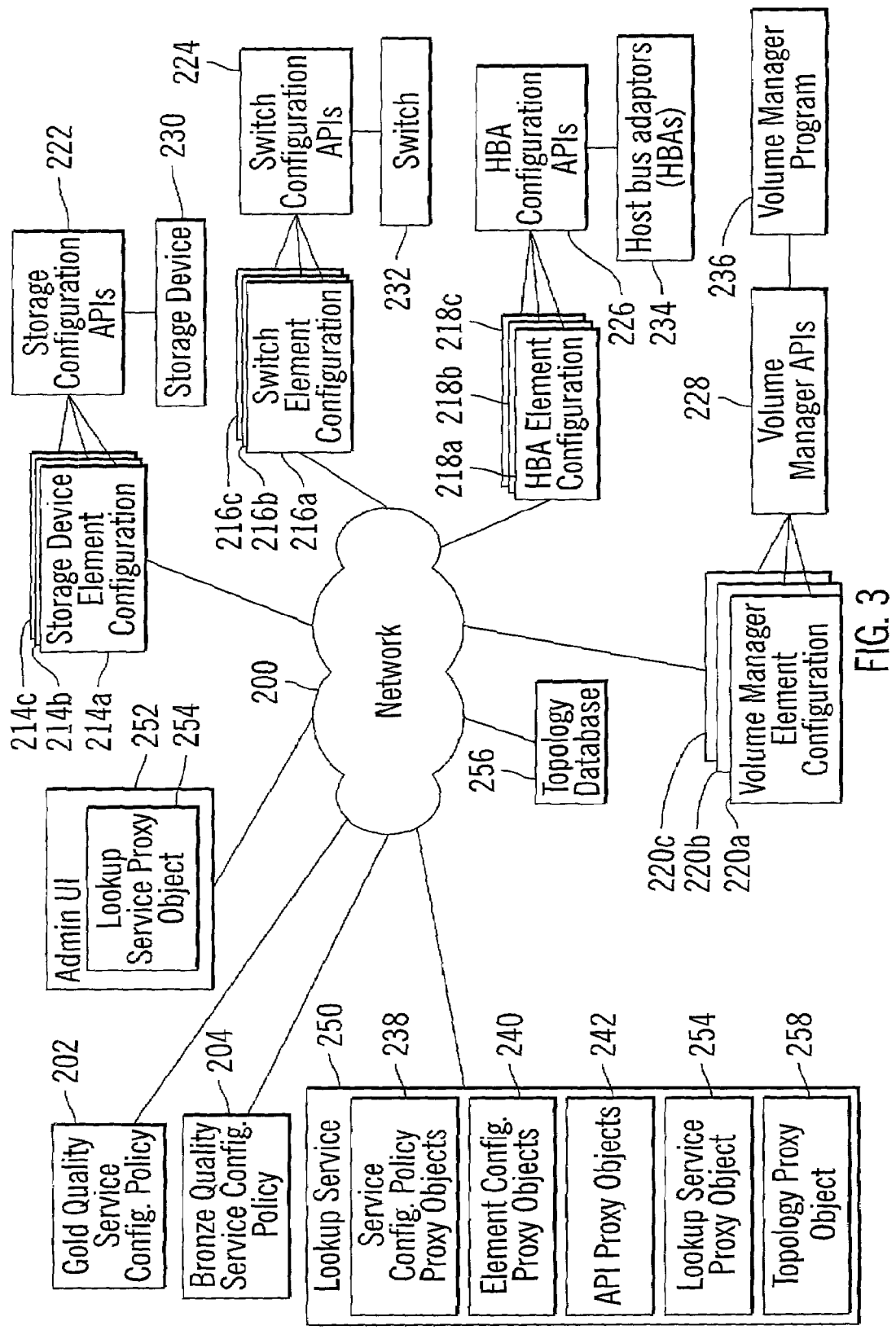
FIG. 3 illustrates a component architecture for a storage network in accordance with certain implementations of the invention.

FIG. 3 illustrates an additional arrangement of the element, service configuration policies, and APIs for the SAN components that may be available over a network 200, including a gold 202 and bronze 204 quality service configuration polices, each providing a different quality of configuration for the system components. The service configuration policies 202 and 204 call one device configuration element for each resource that needs to be configured. The component architecture includes one or more storage device element configurations 214a,b,c, switch element configurations 216a,b,c, host bus adaptor (HBA) element configurations 218a,b,c, and volume manager element configurations 220a,b,c. The configuration elements 214a,b,c, 216a,b,c, 218a,b,c, and 220a,b,c call the resource APIs 222, 224, 226, and 228, respectively, that enable access and control to the commands and functions used to configure the storage device 230, switch 232, host bus adaptors (HBA) 234, and volume manager 236, respectively. In certain implementations, the resource API proxy objects include service attributes that describe the availability of resources for the device which the particular API resources manage, i.e., available storage space, available paths, available host bus adaptor, etc. In the described implementations, there is a separate resource API object for each instance of the device, such that if there are two storage devices in the system, then there would be two storage configuration APIs, each providing the APIs to one of the storage devices. Further, the proxy object for each resource API would include service attributes describing the availability at the resource to which the resource API provides access.

Each of the service configuration policies 202 and 204, configuration elements 214a,b,c, 216a,b,c, 218a,b,c, and 220a,b,c, and resource APIs 222, 224, 226, and 228 would register their respective proxy objects with the lookup service 250. For instance, the service configuration policy proxy objects 238 include the proxy objects for the gold 202 and bronze 200 quality service configuration polices; the element configuration proxy objects 240 include the proxy objects for each element 214a,b,c, 216a,b,c, 218a,b,c, 220a,b,c configuring a resource 230, 232, 234, and 236; and the API proxy objects 242 include the proxy objects for each set of device APIs 222, 224, 226, and 228. As discussed each service configuration policy 200, 202 would call one element for each of the resources 230, 232, 234, and 236 that need to be configured to implement the user requested configuration quality. Each device configuration element 214a,b,c, 216a,b,c, 218a,b,c, and 220a,b,c maintains configuration policy parameters (not shown) that provides a particular quality of configuration of the managed resource. Moreover, additional device element configurations would be provided for each additional devices in the system. For instance, if there were two storage devices in the SAN system, such as a RAID box and a tape drive, there would be separate element configurations to manage each different storage device and separate proxy objects and accompanying APIs to allow access to each of the element configurations for the storage devices. Further, there would be one or more host bus adaptor (HBA) element configurations for each host system to allow configuration and management of all the host bus adaptors (HBAs) in a particular host 4, 6 (FIG. 1). Each proxy object would include service attributes providing information on the resource being managed, such as the amount of available disk space, available paths in the switch, available host bus adaptors at the host, configuration quality and configuration parameters, etc.

An administrator user interface (UI) 252 operates as a Jiro client and provides a user interface to enable access to the lookup service proxy object 254 from the lookup service 250 and enable access to the lookup service proxy object 254 to access the service configuration policies 202 and 204. The administrator 252 is a process running on any system, including the device components shown in FIG. 3, that provides a user interface to access, run, and modify configuration policies. The service configuration policies 202, 204 call the configuration elements 214a,b,c, 216a,b,c, 218a,b,c, and 220a,b,c to configure each resource 230, 232, 234, 236 to implement the allocation of the additional requested storage space to the host. The service configuration polices 202, 204 would provide a graphical user interface (GUI) to enable the administrator to enter resources to configure. Before a user at the administrator UI 252 could utilize the above described component architecture of FIG. 3 to configure components of a SAN system, e.g., the SAN 2 in FIG. 1, the service configuration policies 202, 204, element configurations 214a,b,c, 216a,b,c, 218a,b,c, and 220a,b,c would have to discover and join the lookup service 250 to register their proxy objects. Further, each of the service configuration policies 202 and 204 must download the element configuration proxy objects 240 for the elements 214a,b,c, 216a,b,c, 218a,b,c, and 220a,b,c. The elements 214a,b,c, 216a,b,c, 218a,b,c, and 220a,b,c, in turn, must download one of the API proxy objects 242 for resource APIs 222, 224, 226, and 228, respectively, to perform the desired configuration according to the configuration policy parameters maintained in the element and the host storage allocation request.

FIG. 3 further shows a topology database 256 and topology proxy object 258 that maintains the topology information on the database. Each record may specify the resources in a path.

Figure 4:
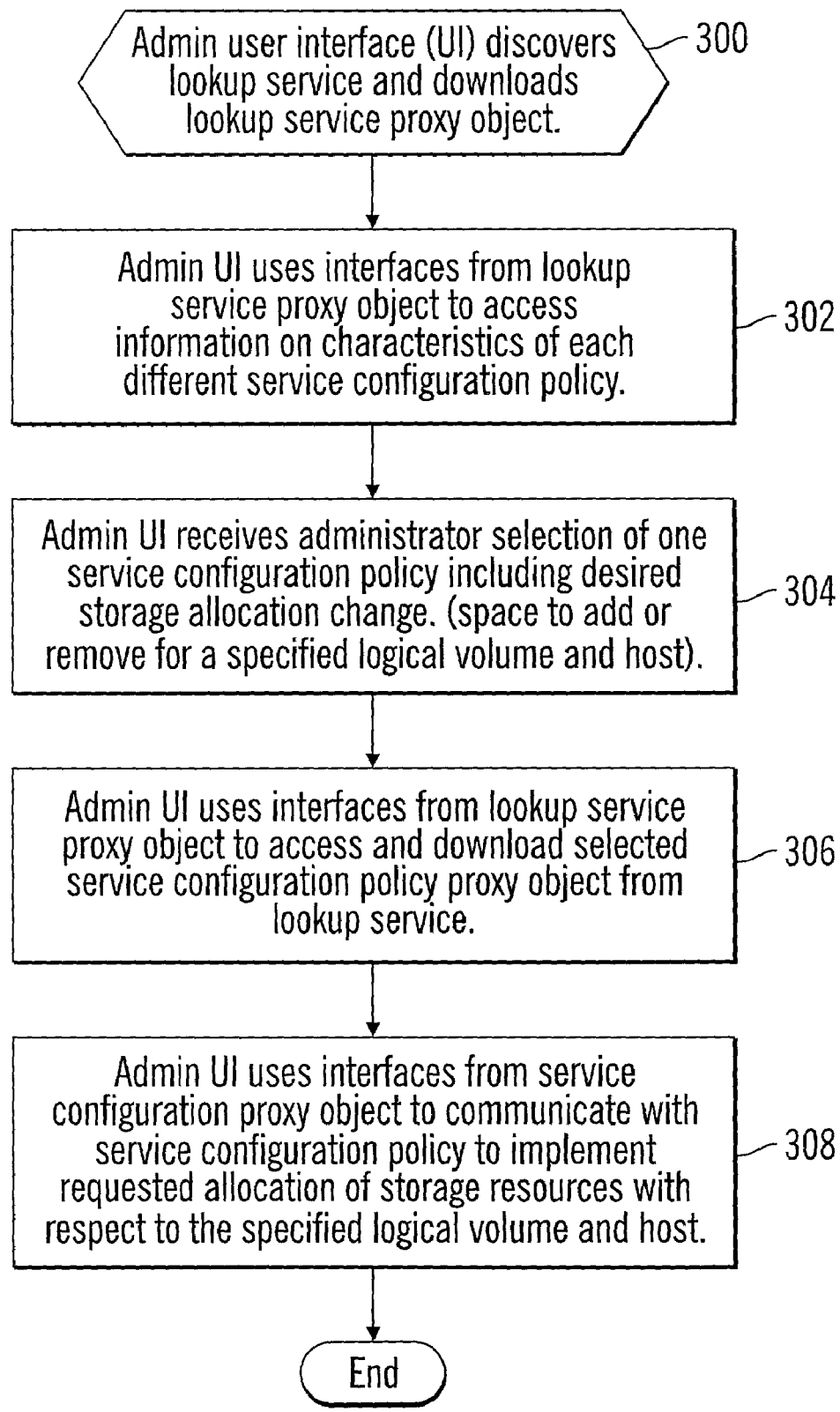
FIG. 4 illustrates logic to invoke a configuration operation in accordance with certain implementations of the invention.

FIG. 4 illustrates logic implemented within the administrator UI 252 to begin the configuration process utilizing the configuration architecture described with respect to FIGS. 2 and 3. Control begins at block 300 with the administrator UI 252 ("admin") discovering the lookup service 250 and downloading the lookup service proxy object 254. The administrator UI 252 then uses (at block 302) the interfaces of the lookup service proxy object 254 to access information on the service attributes providing information on each service configuration policy 202 and 204, such as the quality of availability and path redundancy. A user may then select one of the service configuration policies 202 and 204 appropriate to the availability and redundance needs of the application that will use the new allocation of storage. For instance, a critical database application would require high availability and redundancy, whereas an application involving non-critical data requires less availability and redundancy. The administrator UI 252 then receives user selection (at bock 304) of one of the service configuration policies 202, 204 and a host and logical volume and other device components, such as switch 232 and storage device 230 to configure for the new storage allocation. The administrator UI 252 may execute within the host to which the new storage space will be allocated or be remote to the host.

The administrator UI 252 then uses (at block 306) interfaces from the lookup service proxy object 254 to access and download the selected service configuration policy proxy object. The administrator UI 252 uses (at block 308) interfaces from the downloaded service configuration policy proxy object to communicate with the selected service configuration policy 202 or 204 to implement the requested storage allocation for the specified logical volume and host.

Figure 5:
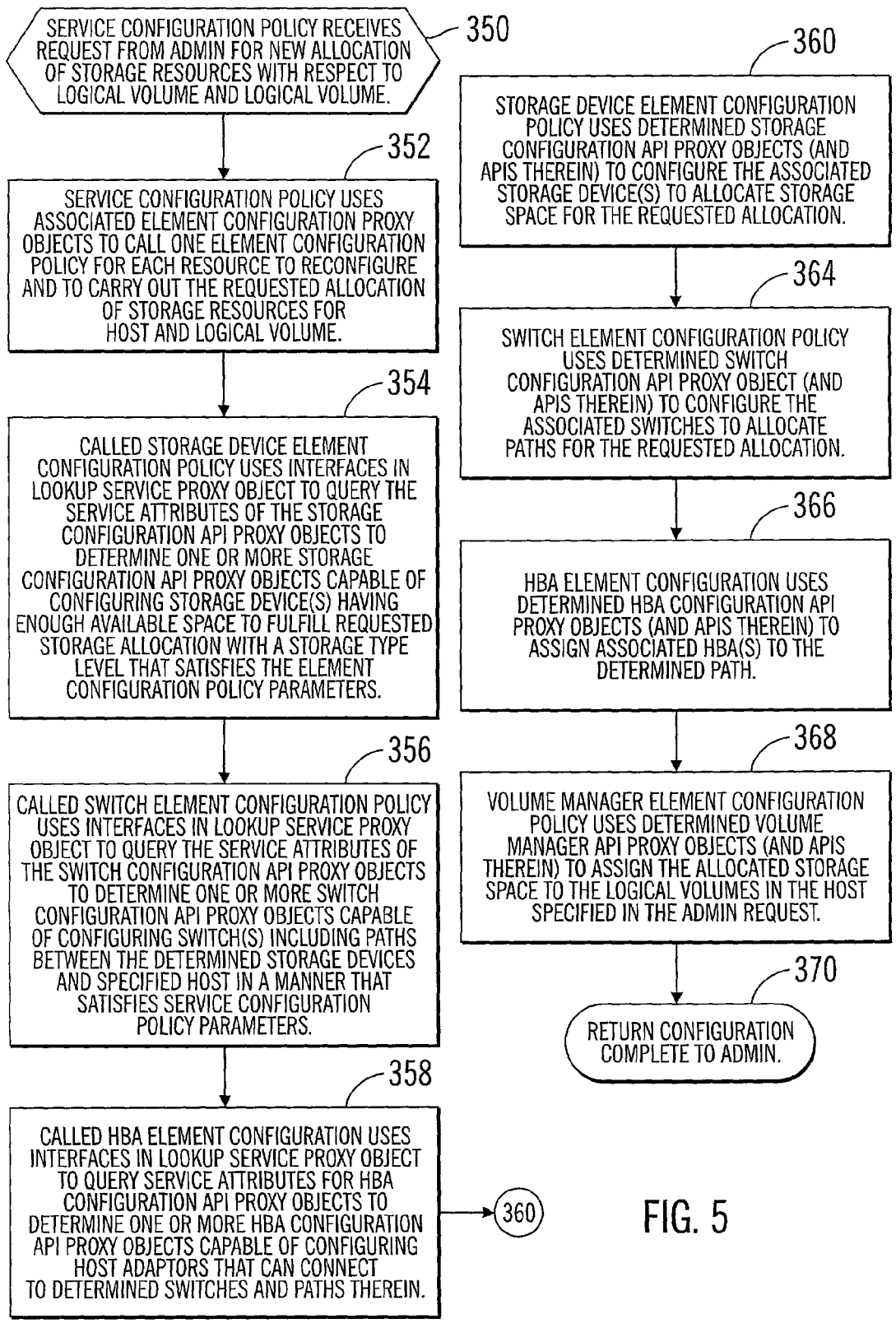
FIG. 5 illustrates logic to configure network components in accordance with certain implementations of the invention.

FIG. 5 illustrates logic implemented in the service configuration policy 202, 204 and element configurations 214a, b,c, 216a,b,c, 218a,b,c, 220a,b,c to perform the requested configuration operation. Control begins at block 350 when the service configuration policy 202, 204 receives a request from the administrator UI 252 for a new allocation of storage space for a logical volume and host through the configuration policy service proxy object 238, 240. In response, the selected service configuration policy 202, 204 calls (at block 352) one associated element configuration proxy object for each resource 222, 224, 226, 228 that needs to be configured to implement the allocation. In the logic described at blocks 354 to 370, the service configuration policy 202, 204 configures the following resources, the storage device 230, switch 232, host bus adaptors 234, and volume manager 236 to carry out the requested allocation. Additionally, the service configuration policy 202, 204 may call elements to configure more or less resources. For instance, for certain configurations, it may not be necessary to assign an additional path to the storage device for the added space. In such case, the service configuration policy 202, 204 would only need to call the storage device element configuration 214a, b,c and volume manager element configuration 220a,b,c to implement the requested allocation.

At block 354, the called storage device element configuration 214a,b,c uses interfaces in the lookup service proxy object 254 to query the service attributes of the storage configuration APIs 222 for storage devices 230 in the system to determine one or more storage configuration API proxy objects capable of configuring storage device(s) 230 having enough available space to fulfill requested storage allocation with a storage type level that satisfies the element configuration policy parameters. For instance, the gold service configuration policy 202 will call device element configurations that provide for redundancy, such as RAID 5 and redundant paths to the storage space, whereas the bronze service configuration policy may not require redundant paths or a high RAID level.

The called switch element configuration 216a,b,c uses (at block 356) interfaces in the lookup service proxy object 254 to query the service attributes of the switch configuration API proxy objects to determine one or more switch configuration API proxy objects capable of configuring switch(s) 132 including paths between the determined storage devices and specified host in a manner that satisfies the called switch element configuration policy parameters. For instance, the gold service configuration policy 202 may require redundant paths through the same or different switches to improve availability, whereas the bronze service configuration policy 200 may not require redundant paths to the storage device.

The called HBA element configuration 218a,b,c uses (at block 358) interfaces in lookup service proxy object 254 to query service attributes for HBA configuration API proxy objects to determine one or more HBA configuration API proxy objects capable of configuring host bus adaptors 234 that can connect to the determined switches and paths that are allocated to satisfy the administrator request.

Note that the above determination of storage devices, switches and host bus adaptors may involve the called device element configuration performing multiple iterations to find some combination of components that can provide the requested storage space allocation to the specified logical volume and host and additionally satisfy the element configuration policy parameters.

After determining the resources 230, 232, and 234 to use to fulfill the administrator UI's 252 storage allocation request, the called device element configurations 214*a,b,c*, 216*a,b,c*, 218*a,b,c*, and 220*a,b,c* call the determined configuration APIs to perform the user requested allocation. At block 360, the previously called storage device element configuration 214*a,b,c* uses the one or more determined storage configuration API proxy objects 224, the APIs therein, to configure the associated storage device(s) to allocate storage space for the requested allocation. At block 364, the switch element configuration 216*a,b,c* uses the one or more determined switch configuration API proxy objects, and APIs therein, to configure the associated switches to allocate paths for the requested allocation.

At block 366, the previously called HBA element configuration 218*a,b,c* uses the determined HBA configuration API proxy objects, and APIs therein, to assign the associated host bus adaptors 234 to the determined path.

At block 368, the volume manager element configuration 220*a,b,c* uses the determined volume manager API proxy objects, and APIs therein, to assign the allocated storage space to the logical volumes in the host specified in the administrator UI request.

The configuration APIs 222, 224, 226, 228, may grant element configurations 214*a,b,c*, 216*a,b,c*, 218*a,b,c*, 220*a,b,c* access to the API resources on an exclusive or non-exclusive basis according to the lease policy for the configuration API proxy objects.

The described implementations thus provide a technique to allow for automatic configuration of numerous SAN resources to allocate storage space for a logical volume on a specified host. In the prior art, users would have to select components to assign to an allocation and then separately invoke different configuration tools for each affected component to implement the requested allocation. With the described implementation, the administrator UI or other entity need only specify the new storage allocation one time, and the configuration of the multiple SAN components is performed by singularly invoking one service configuration policy 200, 202, that then invokes the device element configurations.

Using a Defined Service Configuration Policy to Implement a Resource Allocation

Figure 6:
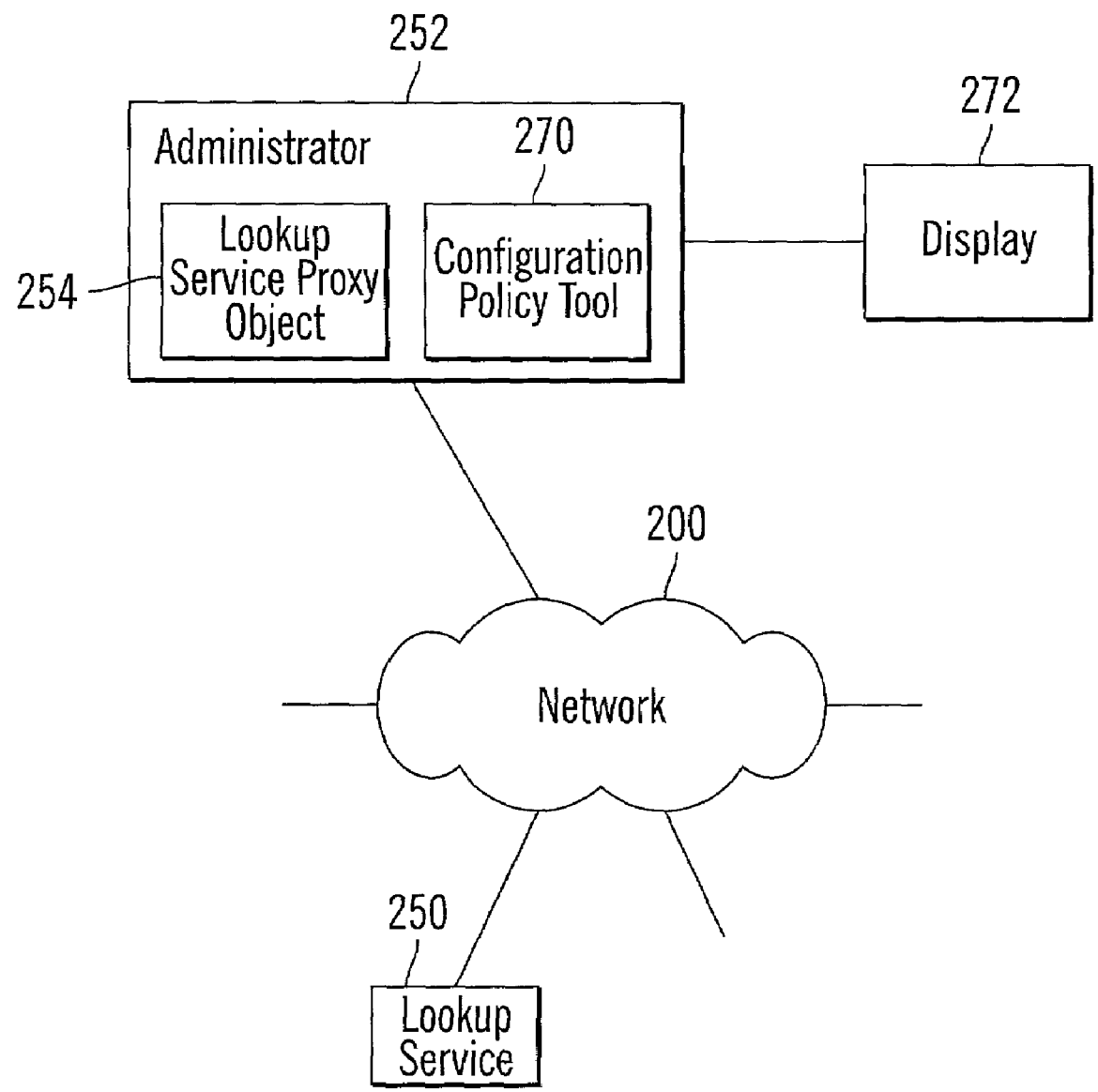
FIG. 6 illustrates further components within the administrator to define and execute configuration policies in accordance with certain implementations of the invention.

FIG. 6 illustrates further details of the administrator UI system 252 including the lookup service proxy object 254 shown in FIG. 3. The administrator UI 252 further includes a configuration policy tool 270 which comprises a software program that a system administrator may invoke to define and add service configuration policies and allocate storage space to a host bus adaptor (HBA) according to a predefined service configuration policy. A display monitor 272 is attached to the administrator UI 252 to display a graphical user interface (GUI) generated by the configuration policy tool 270.

Figure 7:
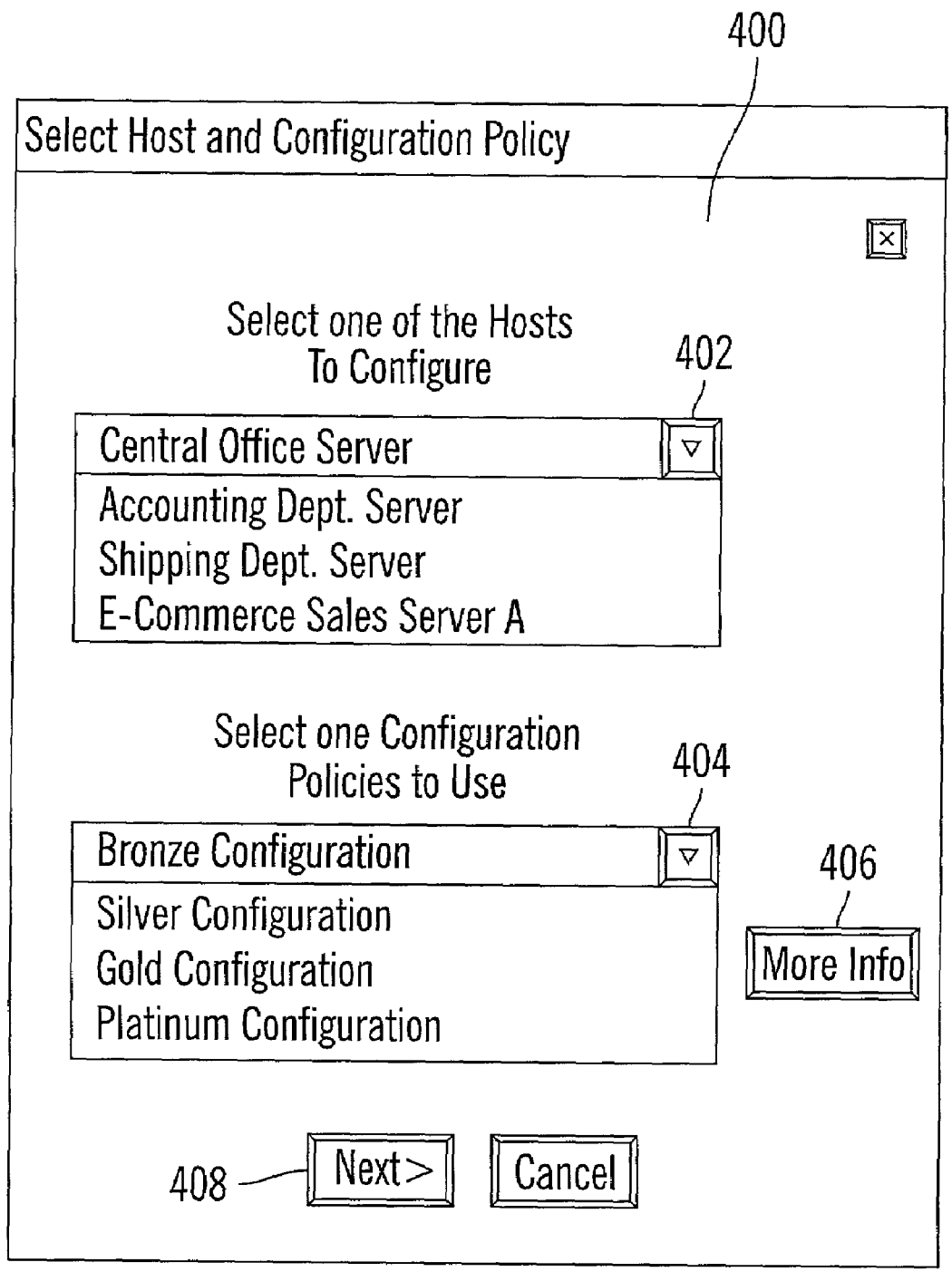
FIGS. 7–8 illustrate GUI panels through which a user invokes a configuration policy to configure and allocate resources to provide storage space in accordance with certain implementations of the invention.
Figure 8:
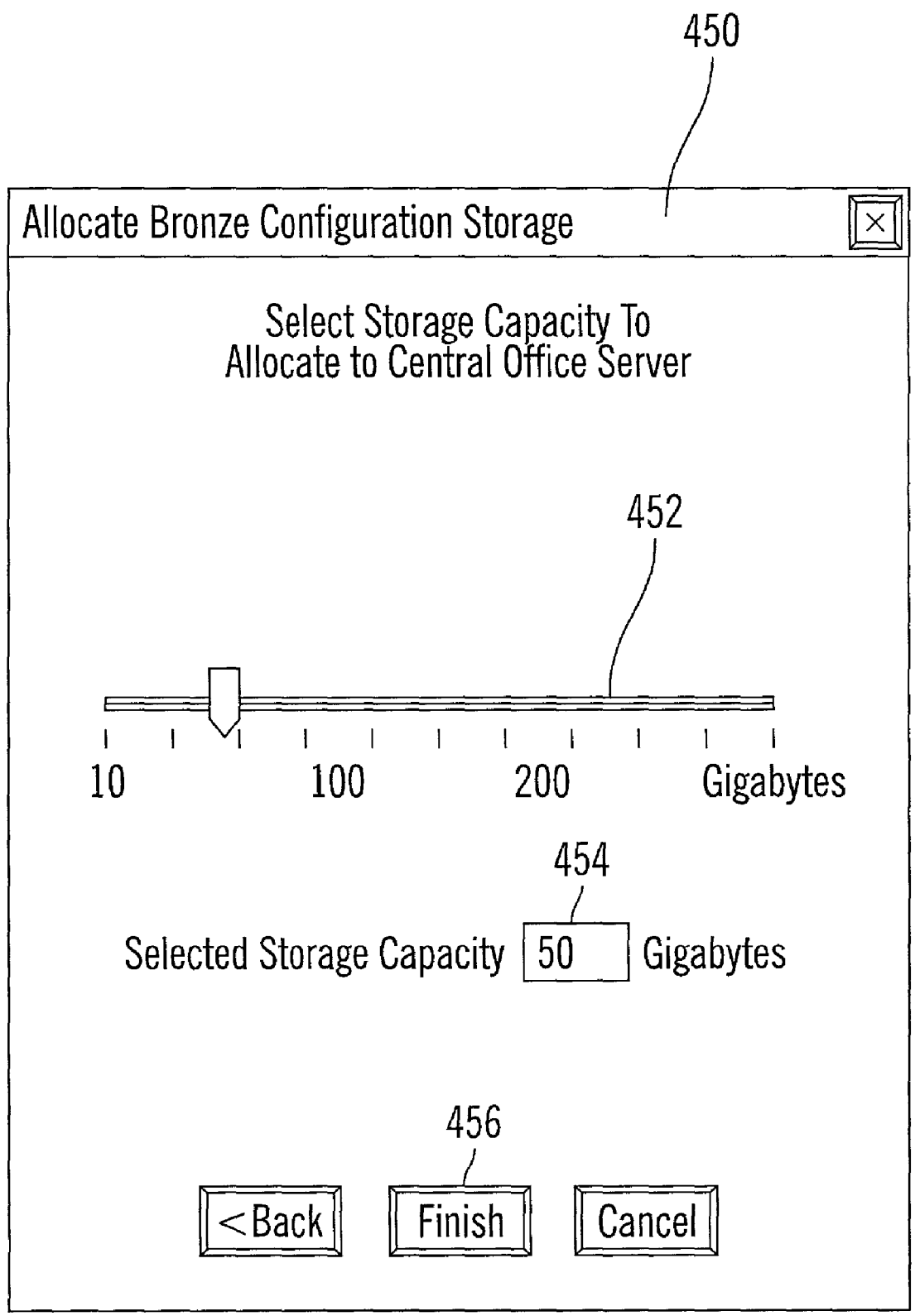

FIGS. 7–8 illustrate GUI panels the configuration policy tool 270 displays to allow the administrator UI to operate one of the previously defined service configuration policies to configure and allocated storage space. FIG. 7 is a GUI panel 400 displaying a drop down menu 402 in which the administrator may select one host including one or more bus adaptors (HBA) in the system for which the resource allocation will be made. A descriptive name of the host or any other name, such as the world wide name, may be displayed in the panel drop down menu 402. After selecting a host, the administrator may select from drop down menu 404 a predefined configuration service policy to use to configure the selected host, e.g., bronze, silver, gold, platinum, etc. Each configuration service policy 200, 202 displayed in the menu 404 has a proxy object 238 registered with the lookup service 250 (FIG. 3). The administrator may obtain more information about the configuration policy parameters for the selected configuration policy displayed in the drop down menu 404 by selecting the "More Info" button 406. The information displayed upon selection of the "More Info" button 406 may be obtained from the service attributes included with the proxy objects 238 for the service configuration policies.

If the administrator selects one host in drop down menu 402, then the configuration policy tool 270 may determine, according to the logic described below with respect to FIG. 9, those service configuration policies 238 that can be used to configure the selected host, and only display those determined service configuration policies in the drop down menu 404 for selection. Alternatively, the administrator may first select a service configuration policy 200, 202 in drop down menu 404, and then the drop down menu 402 would display those hosts that are available to be configured by the selected service configuration policy 200, 202, i.e., those hosts that include a host bus adaptor (HBA) connected to resources, e.g., a switch and storage device, that can satisfy the configuration policy parameters 124 of the elements 106 (FIG. 2), 214*a,b,c*, 216*a,b,c*, 218*a,b,c*, 220*a,b,c* (FIG. 3), included in the selected service configuration policy.

After a service configuration policy and host are selected in drop down menus 402 and 404, the administrator may then select the Next button 408 to proceed to the GUI panel 450 displayed in FIG. 8. The panel 450 displays a slider 452 that the administrator may control to indicate the amount of storage space to allocate to the previously selected host according to the selected service configuration policy. The maximum selectable storage space on the slider 452 is the maximum available for the storage resources that may be configured for the selected host and configuration policy. The minimum storage space indicated on the slider 452 may be the minimum needed to comply with the selected service configuration policy parameters. Panel 450 further displays a text box 454 showing the storage capacity selected on the slider 452. Upon selection of the amount of storage space to allocate using the slider 452 and the Finish button 456, the configuration policy tool 270 would then invoke the selected service configuration policy to allocate the administrator specified storage space using the resources the administrator selected.

Figure 9:
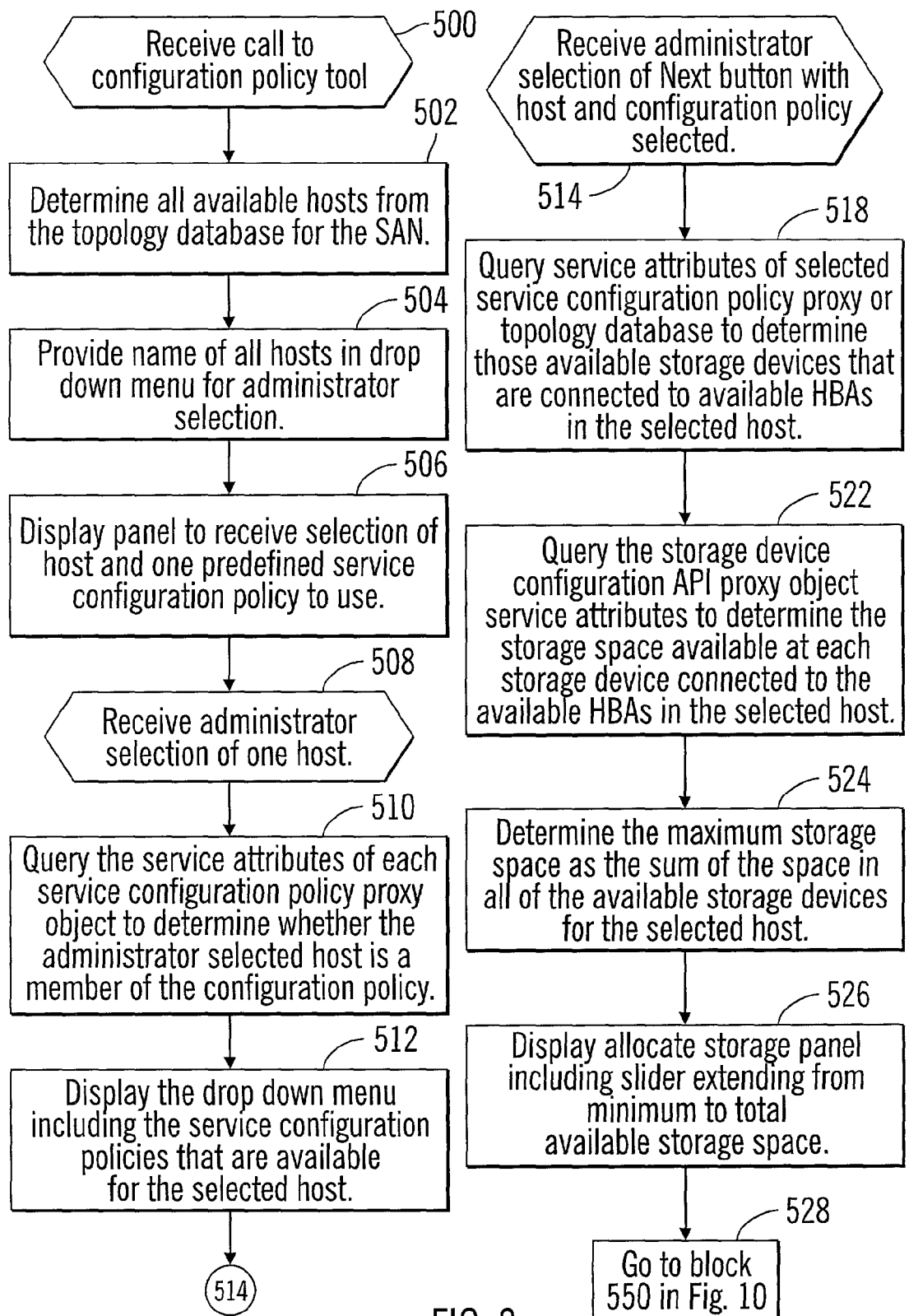
FIGS. 9–10 illustrate logic implemented in the configuration policy tool to enable a user to invoke and use a defined configuration policy to allocate and configure system resources in accordance with certain implementations of the invention.
Figure 10:
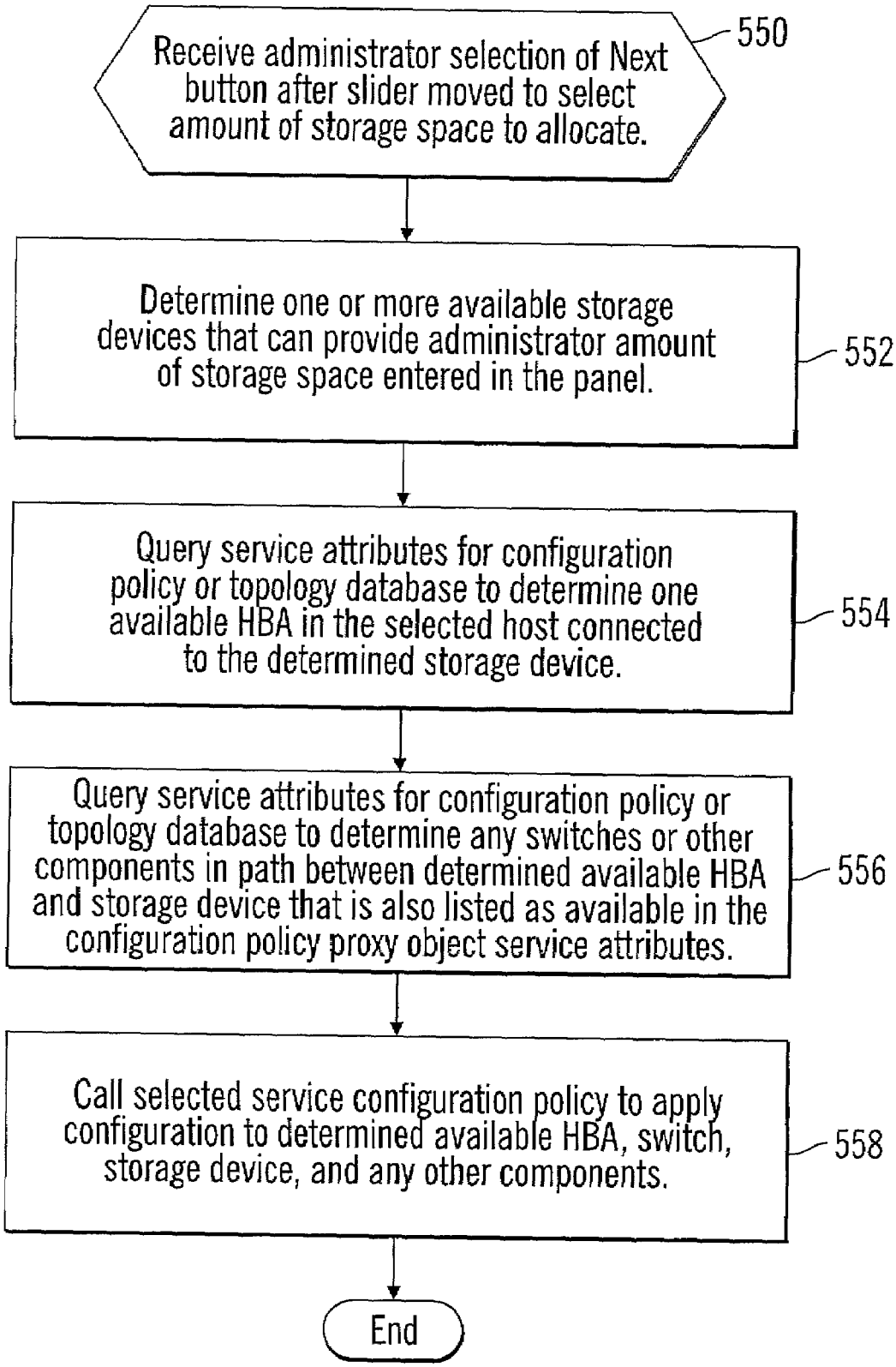

FIGS. 9 and 10 illustrate logic implemented in the configuration policy tool 270 and other of the components in the architecture described with respect to FIGS. 2 and 3 to allocate storage space according to a selected predefined service configuration policy. With respect to FIG. 9, control begins at block 500, where the configuration policy tool 270 is invoked to allocate storage space. The configuration policy tool 270 then determines (at block 502) all the available hosts in the system using the topology database 140 (FIG. 2), 256 (FIG. 3). Alternatively, the configuration policy tool 270 can use the lookup service proxy object 254 to query the service attributes of the proxy objects for the HBA configuration APIs to determine the name of all hosts in the system. A host may include multiple host bus adaptors 234. The name of all the determined hosts are then provided (at block 504) to the drop down menu 402 for administrator selection. The configuration policy tool 270 then displays (at block 506) the panel 400 (FIG. 7) to receive administrator selection of one host and one predefined service configuration policy 200, 202 to use to configure the host.

Upon receiving (at block 508) administrator selection of one host, the configuration policy tool 270 then queries (at block 510) the service attributes 130 (FIG. 2) of each service configuration policy proxy object 120 (FIG. 2), 238 (FIG. 3) to determine whether the administrator selected host is a member of the service configuration policy, i.e., whether the selected host includes a host bus adaptor (HBA) arrangement that can satisfy the requirements of the selected service configuration policy 200, 202. As discussed the service attributes 130 of the configuration policy proxy objects 120 (FIG. 2) provide information on all the resources in the system that may be used and configured by the configuration policy. Alternatively, information on the topology of available resources for the host may be obtained by querying the topology database 256, and then a determination can be made as to whether the resources available to the host as indicated in the topology database 256 are capable of satisfying the configuration policy parameters. Still further, a determination can be made of those resources available to the host as indicated in the topology database 256 that are also listed in the service attributes 130 of the service configuration policy proxy object 120 indicating resources capable of being configured by the service configuration policy 108 represented by the proxy object. The configuration policy tool 270 then displays (at block 512) the drop down menu 404 with the determined service configuration policies that may be used to configure one host bus adaptor (HBA) 234 in the host selected in drop down menu 402 (FIG. 7)

Upon receiving (at block 514) administrator selection of the Next button 408 (FIG. 7) with one host and service configuration policy 200, 202 selected, the configuration policy tool 270 then uses the lookup service proxy object 254 to query (at block 518) the service attributes 130 of the selected service configuration policy proxy object 120 (FIG. 2), 238 (FIG. 3) to determine all the host bus adaptors (HBA) available to the selected service configuration policy that are in the selected host and the available storage devices 230 attached to the available host bus adaptors (HBAs) in the selected host. As discussed, such information on the connectedness or topology of the resources is included in the topology database 140 (FIG. 2), 256 (FIG. 3). The configuration policy tool 270 then queries (at block 522) the service attributes in the storage device configuration API proxy object 242 to determine the allocatable or available storage space in each of the available storage devices connected to the host subject to the configuration. The total available storage space across all the storage devices available to the selected host is determined (at block 524). The storage space allocated to the host according to the configuration policy may comprise a virtual storage space extending across multiple storage devices. The allocate storage panel 450 (FIG. 8) is then displayed (at bock 526) with the slider 452 having as a maximum amount the total storage space in all the available storage devices connected to the host and a minimum amount indicated in the the configuration policy 108, 202 or the configuration policy parameters for the storage device element configuration 214a,b,c (FIG. 3) for the selected configuration policy. Control then proceeds to block 550 in FIG. 10.

Upon receiving (at block 550) administrator selection of the Next button 456 after administrator selection of an amount of storage space using the slider, the configuration policy tool 270 then determines (at block 552) one available storage device that can provide the administrator selected amount of storage. At block 522, the amount of storage space in each available storage device was determined. The configuration policy tool 270 then queries (at block 554) the service attributes of the selected configuration policy proxy object 238 to determine the available host bus adaptor (HBA) in the selected host that is connected to the determined storage device 230 capable of satisfying the administrator selected space allocation. The service attributes are further queried (at block 556) to determine one or more switches in the path between the determined available host bus adaptor (HBA) and the determined storage device. If the selected service configuration policy requires redundant hardware components, then available redundant resources would also be determined. After determining all the resources to use for the allocation that connect to the selected host, the service configuration policy 200, 202 is called (at block 558) to configure the determined resources, e.g., HBA, switch, storage device, and any other components.

In the above described implementation, the administrator only made one resource selection of a host. Alternatively, the administrator may make additional selections of resources, such as select the host bus adaptor (HBA), switch and/or storage device to use. In such case, upon administrator selection of one additional component to use, the configuration policy tool 270 would determine from the service attributes of the selected service configuration policy the available downstream components that is connected to the previously selected resource instances. Thus, administrator or automatic selection of an additional component is available for use with a previous administrator selection.

The above described graphical user interfaces (GUI) allows the administrator to make the minimum necessary selections, such as a host, service configuration policy to use, and storage space to allocate to such host. Based on these selections, the configuration policy tool 270 is able to automatically determine from the registered proxy objects in the look service the resources, e.g., host bus adaptor (HBA), switch, storage, etc., to use to allocate the selected space according to the selected configuration policy without requiring any further information from the administrator. At each step of the selection process, the underlying program components query the system for available resources or options that satisfy the previous administrator selections.

Dynamically Creating a Service Quality Configuration Policy

In certain situations, a systems administrator may want to configure resources according to a pre-defined configuration policy. In other words, the administrator may not be interested in using an already defined configuration policy and, may instead, want to design a configuration policy that satisfies certain service level metrics, such as performance, availability, throughput, latency, etc.

To allow the administrator to configure storage by specifying service level attributes (such as service level metrics), including performance and availability attributes, the service attributes 128a . . . n (FIG. 2) of the element configuration proxy objects 118a . . . n would include the rated and/or field capabilities of the resource (e.g., storage device 230, switch 232, HBA, 234, etc.) that results from the element 106 configuring the resource 112. Such field capabilities include, but are not limited to, availability and performance. The field capabilities may be determined from field data gathered from customers, beta testing and during development of the element 106. For instance, the service attributes for the storage device element configuration policy 214a,b,c (FIG. 3) may indicate the level of availability/redundancy resulting from the configuration, such as the number of disk drives in the storage space that can fail and still allow data recovery, which may be indicated by a RAID level of the configuration. The service attributes for the switch device element configuration policies 216a,b,c may indicate the availability resulting from the switch configurations, such as whether the configuration results in redundant switch components and the throughput of the switch. The service attributes for the HBA element configuration policies 218a,b,c may indicate any redundancies in the configuration. The service attributes for each element configuration policy may also indicate the particular resources or components that can be configured to that configuration policy, i.e., the resources that are capable of being configured by the particular element configuration policy and provide the performance, availability, throughput, and latency attributes indicated in the service attributes for the element configuration.

FIG. 11 illustrates data maintained with the element configuration service attributes 128a . . . n, including an availability/redundancy field 750 which indicates the redundancy level of the element, which is the extent to which failure can be tolerated and the device still function. For instance, for storage devices, the data redundancy would indicate the number of copies of the data which can be accessed in case of failure, thus increasing availability. For instance, the availability service attribute may specify "no single point of failure", which can be implement by using redundant storage device components to ensure continued access to the data in the event of a failure of a percentage of the storage devices. Note, that there is a direct correlation between redundancy and availability in that the greater the number of redundant instances of a component, the greater the chances of data availability in the event that one component instance fails. For switches, host bus adaptors and other resources, the availability/redundancy may indicate the extent to which redundant instances of the resources, or subcomponents therein, are provided with the configuration. The performance field 752 indicates the performance of the resource. For instance, if the resource is a switch, the performance field 752 would indicate the throughput of the switch; if the resource is a storage device, the performance field 752 may indicate the I/O throughput. The configurable resources field 754 indicates those particular resource instances, e.g., specific HBAs, switches, and storage devices, that are capable of being configured by the particular element configuration policy to provide the requested performance and availability/redundancy attributes specified in the fields 750 and 752. The other field 756, which are optional, indicates one or more other performance related attributes, e.g., latency. The element configuration policy ID field 758 provides a unique identifier of the element configuration policy that uses the service attributes and configuration parameters.

Those skilled in the art will appreciate that service attributes can specify different types of performance and availability type of information that result from the configuration provided by the element configuration 214a,b,c, 216a,b,c, 218a,b,c, 220a,b,c having the element configuration policy ID, such as bandwidth, I/O rate, latency, etc.

FIG. 12 illustrates further detail of the administrator configuration policy tool 270 including an element configuration policy attribute table 770 that includes an entry for each element configuration policy indicating the service attributes that result from the application of each element configuration policy 772. For each element configuration policy 772, the table 770 provides a description of the throughput level 774, the availability level 776, and the latency level 778. These service level attributes implemented by the element configuration policies listed in the attribute table 770 may also be found in the service attributes 128a,b . . . n (FIGS. 2 and 11) included with the element proxy objects 118a,b . . . n. The element configuration policy attribute table 770 is updated whenever an element configuration policy 214a,b,c, 216a,b,c, 218a,b,c, 220a,b,c (FIG. 3) is added or updated. The element configuration attribute table 770 may be stored in a file external or internal to the configuration policy tool 270. For instance, the table 770 may be maintained in the lookup service 110, 250 and accessible as a registered proxy object.

Figure 13:
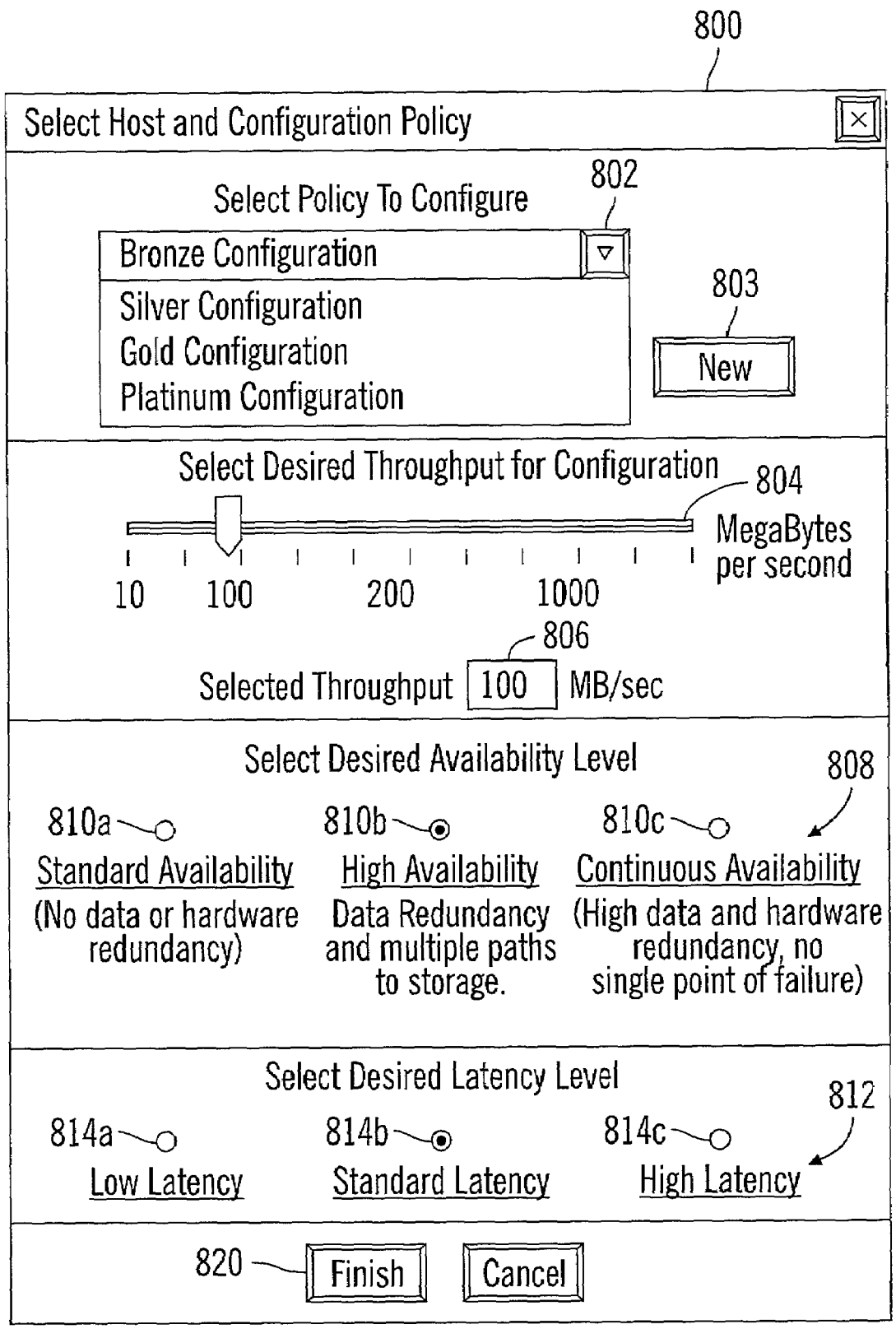
FIG. 13 illustrates a GUI panel through which an administrator may enter information to configure and allocate storage resources in accordance with certain implementations of the invention.

FIG. 13 illustrates a graphical user interface (GUI) panel 800 through which the system administrator would select an already defined configuration policy 200, 202 (FIG. 3) from the drop down menu 802 to adjust or add a new configuration policy by selecting the New button 803. After selecting an already defined or new configuration policy to configure, the administrator would then select the desired performance, availability, throughput (I/Os per second), and latency attributes of the configuration. The slider bar 804 is used to select the desired throughput for the configuration in terms of megabytes per second (Mb/sec). The selected throughput is further displayed in text box 806, and may be manually entered therein. In the availability section 808, the administrator may select one of the radio buttons 810a,b,c to implement a predefined availability level. Each of the selectable availability levels 810a,b,c corresponds to a predefined availability configuration. For instance, the standard availability level 810a may specify a RAID 0 volume with no guaranteed data or hardware redundancy; the high availability 810b may specify some level of data redundancy, e.g., RAID 1 to RAID 5, possible hot sparing, and path redundancy from host to the storage. The continuous availability 810c provides all the performance benefits of high availability and also requires hardware redundancy so that there are no single points of failure anywhere in the system.

Moreover, to improve availability during backup operations, a snapshot program tool may be used to make a copy of pointers to the data to backup. Later during non-peak usage periods, the data addressed by the pointers is copied to a backup archive. Using the snapshot to create a backup by creating pointers to the data increases availability by allowing applications to continue accessing the data when the backup snapshot is made because the data being accessed is not itself copied. Still further, a mirror copy of the data may be made to provide redundancy to improve availability such that in the event of a system failure, data can be made available through the mirror copy. Thus, snapshot and mirror copy elements may be used to implement a configuration to ensure that user selected availability attributes are satisfied.

In the latency section 812, the administrator may select one of the radio buttons 814a,b,c to implement a predefined latency level for a predefined latency configuration. The low latency 814a indicates a low level of delay and the high latency 816 indicates a high level of component delay. For instance, the network latency indicates the amount of time for a packet to travel from a source to destination and storage device latency indicates the amount of time to position the read/write head to the correct location on the disk. A selection of low latency for a storage device can be implemented by providing a cache in which requested data is stored to improve the response time to read and write requests to the storage device. In additional implementations, sliders may be used to allow the user to select the desired data redundancy as a percentage of storage resources that may fail and still allow data to be recovered.

After selecting the desired service parameters for a new or already defined service configuration policy, the administrator would then select the Finish button 820 to update a preexisting service configuration policy selected in the drop down menu 802 or generate the service configuration policy that may then later be selected and used as described with respect to FIG. 7.

Figure 14:
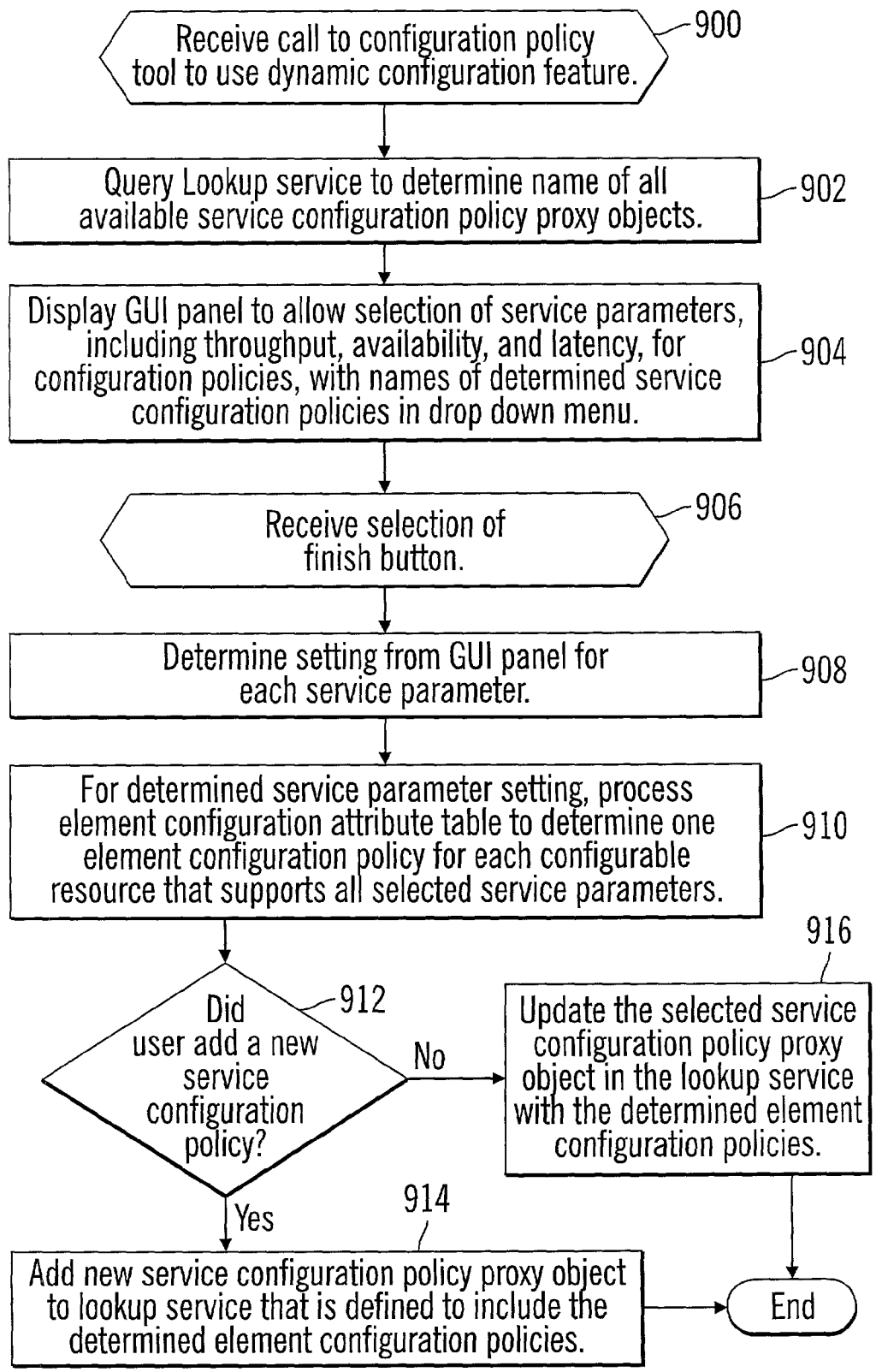
FIG. 14 illustrates logic to configure resources in accordance with certain implementations of the invention.

FIG. 14 illustrate logic implemented in the administrator configuration policy tool 270 (FIG. 6) to utilize the GUI panel 800 in FIG. 13 as well as the element configuration attribute table 770 to enable an administrator to provide a dynamic configuration based on administrator selected throughput, availability, latency, and any other performance parameters. Control begins at block 900 with the administrator invoking the configuration policy tool 270 to use the dynamic configuration feature. The configuration policy tool 270 queries (at block 902) the lookup service 110, 250 (FIGS. 2 and 3) to determine all of the service configuration policy proxy objects 238, such as the gold quality service 202, bronze quality service 200, etc. The GUI panel 800 in FIG. 13 is then displayed (at block 904) to enable the administrator to select the desired throughput, availability level, and latency for a new service configuration policy or one of the service configuration policy determined from the lookup service that is accessible through the drop down menu 802. If the user selects one of the already defined service configuration policies from the drop down menu 802, then, in certain implementations, the service level parameters as indicated in the element configuration attribute table 770 are displayed in the GUI panel 800 as the default service level settings that the user may then further adjust.

In response to receiving (at block 906) selection of the finish button 820, the configuration policy tool 270 determines all the service parameter settings in the GUI panel 800 (FIG. 13) for the throughput 804, availability 808, and latency 812, which may or may not have been user adjusted. For each determined service parameter setting for throughput 804, availability 808, and latency, the element configuration attribute table 770 is processed (at block 910) to determine one element configuration 214a,b,c, 216a,b,c, 218a,b,c, and 220a,b,c (FIG. 3), for each configurable resource, e.g., storage device 230, switch 232, HBA 226, volume manager program 236, etc., that supports all the determined service parameter settings. Such a determination is made by finding one element for each resource having column values 774, 776, and 778 in the element configuration attribute table 770 (FIG. 12) that match the determined service parameter settings in the GUI 800 (FIG. 13). If (at block 912) the administrator added a new service configuration policy by selecting the new button 803 (FIG. 13), then the configuration policy tool 270 would add a new service configuration policy proxy object 238 (FIG. 3) to the lookup service 250 that is defined to include the element configuration policies determined from the table 770. Otherwise, if an already existing service configuration policy, e.g., 200 and 202 (FIG. 3), are being updated, then the proxy object for the modified service configuration policy is updated with the new determined element configuration policies that satisfy the administrator selected service levels.

Thus, with the described implementations the administrator selects desired service levels, such as throughput, availability, latency, etc., and the program then determines those element configuration policies that are capable of configuring the managed resources to provide the desired service level specified by the administrator.

Additional Implementation Details

The described implementations may be realized as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations presented GUI panels including an arrangement of information and selectable items. Those skilled in the art will appreciate that there are many ways the information and selectable items in the illustrated GUI panels may be aggregated into fewer panels or dispersed across a greater number of panels than shown. Further, additional implementations may provide different layout and user interface mechanisms to allow users to enter the information entered through the discussed GUI panels. In alternative embodiments, users may enter information through line commands as opposed to a GUI.

The implementations were described with respect to the Sun Microsystems, Inc. Jiro network environment that provides distributed computing. However, the described technique for configuration of components may be implemented in alternative network environments where a client downloads an object or code from a server to use to access a service and resources at that server. Moreover, the described configuration policy services and configuration elements that were described as implemented in the Java programming language as Jiro proxy objects may be implemented in any distributed computing architecture known in the art, such as the Common Object Request Broker Architecture (CORBA), the Microsoft .NET architecture**, Distributed Computing Environment (DCE), Remote Method Invocation (RMI), Distributed Component Object Model (DCOM), etc. The described configuration policy services and configuration elements may be coded using any known programming language (e.g., C++, C, Assembler, etc.) to perform the functions described herein.

**JIRO, JAVA, SUN, and SUN MICROSYSTEMS are trademarks of Sun Microsystems, Inc. InfiniBand is a service mark of the InfiniBand Trade Association; MICROSOFT and .NET are trademarks of Microsoft Corporation.

In the described implementations, the storage comprised network storage accessed over a network. Additionally, the configured storage may comprise a storage device directly attached to the host. The storage device may comprise any storage system known in the art, including hard disk drives, DASD, JBOD, RAID array, tape drive, tape library, optical disk library, etc.

The described implementations may be used to configure other types of device resources capable of communicating on a network, such as a virtualization appliance which provides a logical representation of physical storage resources to host applications and allows configuration and management of the storage resources.

The described logic of FIGS. 4 and 5 concerned a request to add additional storage space to a logical volume. However, the above described architecture and configuration technique may apply to other types of operations involving the allocation of storage resources, such as freeing-up space from one logical volume or requesting a reallocation of storage space from one logical volume to another.

The configuration policy services 202, 204 may control the configuration elements 214*a,b,c*, 216*a,b,c*, 218*a,b,c*, and 220*a,b,c* over the Fibre Channel links or use an out-of-band communication channel, such as through a separate LAN connecting the devices 230, 232, and 234.

The configuration elements 214*a,b,c*, 216*a,b,c*, 218*a,b,c*, and 220*a,b,c* may be located on the same computing device including the requested resource, e.g., storage device 230, switch 232, host bus adaptors 234, or be located at a remote location from the resource being managed and configured.

In the described implementations, the service configuration policy service configures a switch when allocating storage space to a specified logical volume in a host. Additionally, if there are no switches (fabric) in the path between the specified host and storage device including the allocated space, there would be no configuration operation performed with respect to the switch.

In the described implementations, the service configuration policy was used to control elements related to the components within a SAN environment. Additionally, the configuration architecture of FIG. 2 may apply to any system in which an operation is performed, such as an allocation of resources, that requires the management and configuration of different resources throughout the system. In such cases, the elements may be associated with any element within the system that is manipulated through a configuration policy service.

In the described implementations, the architecture was used to alter the allocation of resources in the system. Additionally, the described implementations may be used to control system components through the elements to perform operations other than configuration operations, such as operations managing and controlling the device.

The above implementations were described with respect to a Fibre Channel environment. Additionally, the above described implementations of the invention may apply to other network environments, such as InfiniBand, Gigabit Ethernet, TCP/IP, iSCSI, the Internet, etc.

In the above described implementations, specific operations were described as being performed by a service configuration policy, device element configuration and device APIs. Alternatively, functions described as being performed with respect to one type of object may be implemented in another object. For instance, operations described as performed with respect to the element configurations may be performed by the service configuration policies.

The foregoing description of the implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for configuring multiple resources in a system, including a host adaptor, a switch and a storage device, the method comprising:

providing a plurality of elements capable of configuring resources in the system, wherein each element specifies configuration parameters to use to configure instances of the resource, and wherein each resource is capable of being configured by multiple elements, each of which provides a different configuration of the resource;

maintaining service information for each element indicating at least one service attribute that results from the configuration of a resource by that element;

receiving at least one administrator specified service attribute for a configuration, the administrator specified service attribute including a first availability option, a second availability option, and a third availability option, wherein the first availability option does not define any data and hardware redundancy, wherein the second availability option defines data redundant for a configured storage device, and wherein the third availability option defines data redundancy of a configured storage device and redundancy of at least one other switch or host adaptor component;

comparing the administrator specified service attribute to the service information to determine at least one element and resource configured thereby for which the service information indicates a service attribute that matches the at least one administrator specified service attribute; and using the determined elements to configure resource instances indicated in the service information to implement the specified service attributes.

2. The method of claim 1, further comprising:

receiving information indicating a specified host from the administrator for which the resources will be configured, and wherein the configured resource instances are used by the specified host.

3. The method of claim 1, wherein at least one resource to configure comprises a storage resource, wherein storage elements are capable of providing different configurations of the storage resources, further comprising:

determining total available storage space at the determined storage resource instances;

presenting information on the total available storage space; and receiving administrator input in response to the presented information indicating selected storage space less than the available storage space to allocate.

4. The method of claim 3, further comprising:

determining storage resource instances capable of being configured by the determined storage element to allocate the administrator selected storage space.

5. The method of claim 1, wherein at least one resource comprises a switch, wherein the service information for switch elements that configure the switch resource indicates a data throughput of the switch, wherein the administrator specified service attribute indicates a specified data throughput, wherein the determined switch element has service information that satisfies the specified data throughput, and wherein the determined switch element configures at least one switch instance to provide the specified data throughput.

6. The method of claim 1, wherein at least one resource comprises a host adaptor in a host, wherein the resources are being configured for use by the host, wherein the service information for switch elements that configure the switch resource indicates one of multiple availability levels, wherein the administrator specified service attribute indicates a specified availability level, wherein the determined host adaptor element has service information that satisfies the specified availability level, and wherein the determined host adaptor element configures at least one host adaptor instance in the host to provide the administrator specified availability level.

7. The method of claim 6, wherein the administrator specified availability level defines redundant paths from the host to storage resources, and wherein the determined host adaptor element configures multiple host adaptors in the host to enable multiple paths to communicate with the storage resource.

8. The method of claim 1, wherein at least one resource comprises a switch, wherein the service attributes in the service information for switch elements that configure the switch resource indicates an availability level indicating whether redundant switch components are provided with the configuration, wherein the administrator specified service attribute indicates one specified availability level, wherein the determined switch element has service information that satisfies the specified availability level, and wherein the determined switch element configures switch components to provide the specified availability level.

9. The method of claim 1, wherein at least one of the determined resources comprises a storage resource, wherein the service information associated with storage elements that configure the storage resource includes at least one service attribute indicating an availability attribute, wherein the administrator specified service attributes for the storage resource indicates one specified availability level, and wherein the selected storage element that configures the storage resource has service information that satisfies the administrator specified availability level.

10. The method of claim 1, wherein the resources to configure are members of the set of configurable resources comprising a host adaptor, switch, storage resource, virtualization appliance, volume manager, and snapshot program.

11. The method of claim 1, wherein the administrator specified at least one service attribute indicates availability and performance for the host adaptor, switch, and storage devices to configure for a host, and wherein the determined elements for configuring the host adaptor, switch, and storage devices have service information that satisfies the administrator specified availability and performance attributes for the host adaptor, switch, and storage device.

12. The method of claim 1, wherein the administrator specified service attribute indicates to provide a redundant instance of at least one resource, and wherein at least one determined element has service information indicating a redundant instance of the at least one resource indicated as redundant by the administrator specified availability.

13. The method of claim 1, further comprising:
registering, with each element, a proxy object including interfaces used to access the element with a lookup service, wherein the proxy object includes the service information, and wherein the elements are used to configure the selected resources by using the interfaces for the elements maintained in the element proxy objects.

14. A method for configuring storage resources in a system including a host adaptor, a switch and a storage device, the method comprising:
providing a plurality of storage elements capable of configuring the storage resources in the system, wherein each storage element specifies configuration parameters to use to configure the storage resource, and wherein each storage resource is capable of being configured by multiple storage elements, each of which provides a different configuration of the storage resource;
maintaining service information for each storage element indicating at least one storage attribute resulting from the configuration of a resource by the element;
receiving at least one administrator specified service attribute for the configuration of the storage resource, the administrator specified service attribute including a first availability option, a second availability option, and a third availability option, wherein the first availability option does not define any data and hardware redundancy, wherein the second availability option defines data redundancy for a configured storage device, and wherein the third availability option defines data redundancy of a configured storage device and redundancy of at least one other switch or host adaptor component;
comparing the administrator specified service attribute to the service information to determine one storage element and storage resource configured thereby for which the service information indicates a service attribute that matches the administrator specified service attribute; and
using the determined storage element to configure the storage resources indicated in the service information to implement the specified service attributes.

15. The method of claim 14, wherein the at least one service attribute in the service information indicates at least one performance and availability attribute resulting from the configuration of the resource by the element.

16. The method of claim 14, wherein the configurable storage resources comprise virtualization appliances.

17. A system for configuring multiple resources, comprising:
a plurality of configurable resources, including a host adaptor, a switch and a storage device;
means for providing a plurality of elements capable of configuring the resources in the system, wherein each element specifies configuration parameters to use to configure instances of the resource, and wherein each resource is capable of being configured by multiple elements each of which provides a different configuration of the resource;
means for maintaining service information for each element indicating at least one service attribute that results from the configuration of the a resource by that element;
means for receiving at least one administrator specified service attribute for a configuration, the administrator specified service attribute including a first availability option, a second availability option, and a third availability option, wherein the first availability option does not define any data and hardware redundancy, wherein the second availability option defines data redundancy for a configured storage device, and wherein the third availability option defines data redundancy of a configured storage device and redundancy of at least one other switch or host adaptor component;

means for comparing the administrator specified service attribute to the service information to determine at least one element and resource configured thereby for which the service information indicates a service attribute that matches the at least one administrator specified service attribute; and means for using the determined elements to configure resource instances indicated in the service information to implement the specified service attributes.

18. The system of claim 17, further comprising:
means for receiving information indicating a specified host from the administrator for which the resources will be configured, and wherein the configured resource instances are used by the specified host.

19. The system of claim 17, wherein at least one resource to configure comprises a storage resource, wherein storage elements are capable of providing different configurations of the storage resources, further comprising:
means for determining total available storage space at the determined storage resource instances;
means for presenting information on the total available storage space; and
means for receiving administrator input in response to the presented information indicating selected storage space less than the available storage space to allocate.

20. The system of claim 19, further comprising:
means for determining storage resource instances capable of being configured by the determined storage element to allocate the administrator selected storage space.

21. The system of claim 17, wherein at least one resource comprises a switch, wherein the service information for switch elements that configure the switch resource indicates a data throughput of the switch, wherein the administrator specified service attribute indicates a specified data throughput, wherein the determined switch element has service information that satisfies the specified data throughput, and wherein the determined switch element configures at least one switch instance to provide the specified data throughput.

22. The system of claim 17, wherein at least one resource comprises a host adaptor in a host, wherein the resources are being configured for use by the host, wherein the service information for switch elements that configure the switch resource indicates one of multiple availability levels, wherein the administrator specified service attribute indicates a specified availability level, wherein the determined host adaptor element has service information that satisfies the specified availability level, and wherein the determined host adaptor element configures at least one host adaptor instance in the host to provide the administrator specified availability level.

23. The system of claim 22, wherein the administrator specified availability level defines redundant paths from the host to storage resources, and wherein the determined host adaptor element configures multiple host adaptors in the host to enable multiple paths to communicate with the storage resource.

24. The system of claim 17, wherein at least one resource comprises a switch, wherein the service attributes in the service information for switch elements that configure the switch resource indicates an availability level indicating whether redundant switch components are provided with the configuration, wherein the administrator specified service attribute indicates one specified availability level, wherein the determined switch element has service information that satisfies the specified availability level, and wherein the determined switch element configures switch components to provide the specified availability level.

25. The system of claim 17, wherein at least one of the determined resources comprises a storage resource, wherein the service information associated with storage elements that configure the storage resource includes at least one service attribute indicating an availability attribute, wherein the administrator specified service attributes for the storage resource indicates one specified availability level, and wherein the selected storage element that configures the storage resource has service information that satisfies the administrator specified availability level.

26. The system of claim 17, wherein the resources to configure are members of the set of configurable resources comprising a host adaptor, switch, storage resource, virtualization appliance, volume manager, and snapshot program.

27. The system of claim 17, wherein the administrator specified at least one service attribute indicates availability and performance for the host adaptor, switch, and storage devices to configure for a host, and wherein the determined elements for configuring the host adaptor, switch, and storage devices have service information that satisfies the administrator specified availability and performance attributes for the host adaptor, switch, and storage device.

28. The system of claim 17, wherein the administrator specified service attribute indicates to provide a redundant instance of at least one resource, and wherein at least one determined element has service information indicating a redundant instance of the at least one resource indicated as redundant by the administrator specified availability.

29. The system of claim 17, further comprising:
a lookup server including lookup service;
means for registering, for each element, a proxy object including interfaces used to access the element with the lookup service, wherein the proxy object includes the service information, and wherein the elements are used to configure the selected resources by using the interfaces for the elements maintained in the element proxy objects.

30. A system for configuring storage resources in a system, comprising:
storage resources including a host adaptor, a switch and a storage device;
means for providing a plurality of storage elements capable of configuring the storage resources in the system, wherein each storage element specifies configuration parameters to use to configure the storage resource, and wherein each storage resource is capable of being configured by multiple storage elements, each of which provides a different configuration of the storage resource;
means for maintaining service information for each element indicating at least one storage attribute resulting from the configuration of a storage resource by that element;
means for receiving at least one administrator specified service attribute for the configuration of the storage resource, the administrator specified service attribute including a first availability option, a second availability option, and a third availability option, wherein the first availability option does not define any data and hardware redundancy, wherein the second availability option defines data redundancy for a configured storage device, and wherein the third availability option defines data redundancy of a configured storage device and redundancy of at least one other switch or host adaptor component;

means for comparing the administrator specified service attribute to the service information to determine one storage element and storage resource configured thereby for which the service information indicates at least one service attribute that matches the administrator specified service attribute; and means for using the determined storage element to configure the storage resources indicated in the service information to implement the specified service attributes.

31. The system of claim 30, wherein the at least one service attribute in the service information indicates at least one performance and availability attribute resulting from the configuration of the resource by the element.

32. The method of claim 30, wherein the configurable storage resources include virtualization appliances.

33. An article of manufacture including code embodied in a computer readable storage medium for configuring multiple resources in a system, including a host adaptor, a switch and a storage device, wherein the code causes operations comprising:

providing a plurality of elements capable of configuring resources in the system, wherein each element specifies configuration parameters to use to configure instances of the resource, and wherein each resource is capable of being configured by multiple elements, each of which provides a different configuration of the resource;

maintaining service information for each element indicating at least one service attribute that results from the configuration of a resource by that element;

receiving at least one administrator specified service attribute for a configuration, the administrator specified service attribute including a first availability option, a second availability option, and a third availability option, wherein the first availability option does not define any data and hardware redundancy, wherein the second availability option defines data redundancy for a configured storage device, and wherein the third availability option defines data redundancy of a configured storage device and redundant of at least one other switch or host adaptor component;

comparing the administrator specified service attribute to the service information to determine at least one element and resource configured thereby for which the service information indicates a service attribute that matches the at least one administrator specified service attribute; and using the determined elements to configure resource instances indicated in the service information to implement the specified service attributes.

34. The article of manufacture of claim 33, wherein the code further causes operations comprising:

receiving information indicating a specified host from the administrator for which the resources will be configured, and wherein the configured resource instances are used by the specified host.

35. The article of manufacture of claim 33, wherein at least one resource to configure comprises a storage resource, wherein storage elements are capable of providing different configurations of the storage resources, wherein the code further causes operations comprising:

determining total available storage space at the determined storage resource instances;

presenting information on the total available storage space; and receiving administrator input in response to the presented information indicating selected storage space less than the available storage space to allocate.

36. The article of manufacture of claim 35, wherein the code further causes operations comprising:

determining storage resource instances capable of being configured by the determined storage element to allocate the administrator selected storage space.

37. The article of manufacture of claim 33, wherein at least one resource comprises a switch, wherein the service information for switch elements that configure the switch resource indicates a data throughput of the switch, wherein the administrator specified service attribute indicates a specified data throughput, wherein the determined switch element has service information that satisfies the specified data throughput, and wherein the determined switch element configures at least one switch instance to provide the specified data throughput.

38. The article of manufacture of claim 33, wherein at least one resource comprises a host adaptor in a host, wherein the resources are being configured for use by the host, wherein the service information for switch elements that configure the switch resource indicates one of multiple availability levels, wherein the administrator specified service attribute indicates a specified availability level, wherein the determined host adaptor element has service information that satisfies the specified availability level, and wherein the determined host adaptor element configures at least one host adaptor instance in the host to provide the administrator specified availability level.

39. The article of manufacture of claim 38, wherein the administrator specified availability level defines redundant paths from the host to storage resources, and wherein the determined host adaptor element configures multiple host adaptors in the host to enable multiple paths to communicate with the storage resource.

40. The article of manufacture of claim 33, wherein at least one resource comprises a switch, wherein the service attributes in the service information for switch elements that configure the switch resource indicates an availability level indicating whether redundant switch components are provided with the configuration, wherein the administrator specified service attribute indicates one specified availability level, wherein the determined switch element has service information that satisfies the specified availability level, and wherein the determined switch element configures switch components to provide the specified availability level.

41. The article of manufacture of claim 33, wherein at least one of the determined resources comprises a storage resource, wherein the service information associated with storage elements that configure the storage resource includes at least one service attribute indicating an availability attribute, wherein the administrator specified service attributes for the storage resource indicates one specified availability level, and wherein the selected storage element that configures the storage resource has service information that satisfies the administrator specified availability level.

42. The article of manufacture of claim 33, wherein the resources to configure are members of the set of configurable resources comprising a host adaptor, switch, storage resource, virtualization appliance, volume manager, and snapshot program.

43. The article of manufacture of claim 33, wherein the administrator specified at least one service attribute indicates availability and performance for the host adaptor, switch, and storage devices to configure for a host, and wherein the determined elements for configuring the host adaptor, switch, and storage devices have service information that satisfies the administrator specified availability and performance attributes for the host adaptor, switch, and storage device.

44. The article of manufacture of claim 33, wherein the administrator specified service attribute indicates to provide a redundant instance of at least one resource, and wherein at least one determined element has service information indicating a redundant instance of the at least one resource indicated as redundant by the administrator specified availability.

45. The article of manufacture of claim 33, wherein the code further causes operations comprising:
   registering, with each element, a proxy object including interfaces used to access the element with a lookup service, wherein the proxy object includes the service information, and wherein the elements are used to configure the selected resources by using the interfaces for the elements maintained in the element proxy objects.

46. An article of manufacture including code embodied in a computer readable storage medium for configuring storage resources in a system, including a host adaptor, a switch and a storage device, wherein the code causes operations comprising:
   providing a plurality of storage elements capable of configuring the storage resources in the system, wherein each storage element specifies configuration parameters to use to configure the storage resource, and wherein each storage resource is capable of being configured by multiple storage elements, each of which provides a different configuration of the storage resource;
   maintaining service information for each storage element indicating at least one storage attribute resulting from the configuration of a storage resource by that element;
   receiving at least one administrator specified service attribute for the configuration of the storage resource, the administrator specified service attribute including a first availability option, a second availability option, and a third availability option, wherein the first availability option does not define any data and hardware redundancy, wherein the second availability option defines data redundancy for a configured storage device, and wherein the third availability option defines data redundancy of a configured storage device and redundancy of at least one other switch or host adaptor component;
   comparing the administrator specified service attribute to the service information to determine one storage element and storage resource configured thereby for which the service information indicates at least one service attribute that matches the administrator specified service attribute; and
   using the determined storage element to configure storage resources indicated in the service information to implement the specified service attributes.

47. The article of manufacture of claim 46, wherein the at least one service attribute in the service information indicates at least one performance and availability attribute resulting from the configuration of the resource by the element.

48. The article of manufacture of claim 46, wherein the configurable storage resources comprise virtualization appliances.

* * * * *